United States Patent
Malek et al.

(10) Patent No.: US 6,182,112 B1
(45) Date of Patent: Jan. 30, 2001

(54) METHOD OF AND APPARATUS FOR BANDWIDTH CONTROL OF TRANSFERS VIA A BI-DIRECTIONAL INTERFACE

(75) Inventors: Robert Marion Malek, White Bear Lake; Roger L. Gilbertson, Minneapolis; Mitchell Anthony Bauman, Circle Pines, all of MN (US)

(73) Assignee: Unisys Corporation, Blue Bell, PA (US)

(*) Notice: Under 35 U.S.C. 154(b), the term of this patent shall be extended for 0 days.

(21) Appl. No.: 09/096,624

(22) Filed: Jun. 12, 1998

(51) Int. Cl.$^7$ ................................................. G06F 13/00
(52) U.S. Cl. .................. 709/201; 709/202; 709/203; 709/231; 710/107; 710/31; 710/129
(58) Field of Search ............................... 710/107, 110, 710/128–129, 131, 7, 20–21, 27, 31, 38, 42, 45, 61; 709/213, 214, 231–232, 238, 239, 250, 201–203; 712/28, 29, 31; 711/147, 148, 150

(56) References Cited

U.S. PATENT DOCUMENTS

| | | | |
|---|---|---|---|
| 4,595,911 | 6/1986 | Kregness et al. | 340/347 |
| 4,881,165 | 11/1989 | Sager et al. | 364/200 |
| 5,195,185 | 3/1993 | Marenin | 395/325 |
| 5,202,966 | 4/1993 | Woodson | 395/325 |
| 5,255,375 | 10/1993 | Crook et al. | 395/325 |
| 5,384,906 * | 1/1995 | Horst | 371/47.1 |
| 5,630,063 * | 5/1997 | McConnell | 709/201 |
| 5,634,060 | 5/1997 | Jennings | 395/729 |
| 5,640,600 * | 6/1997 | Satoh et al. | 710/33 |
| 5,666,551 * | 9/1997 | Fenwick et al. | 709/207 |
| 5,723,995 | 3/1998 | Mozdzen et al. | 327/293 |
| 5,751,976 * | 5/1998 | Okazawa et al. | 710/126 |
| 5,768,529 | 6/1998 | Mikel et al. | 395/200 |
| 5,805,821 * | 9/1998 | Saxena et al. | 709/231 |
| 5,815,680 * | 9/1998 | Okumura et al. | 710/131 |
| 5,889,966 * | 3/1999 | Sonobe | 710/107 |
| 5,890,203 * | 3/1999 | Aoki | 711/111 |
| 5,905,874 * | 5/1999 | Johnson | 709/250 |
| 5,923,339 * | 7/1999 | Date et al. | 345/505 |
| 5,925,120 * | 7/1999 | Arp et al. | 710/131 |
| 5,949,982 * | 9/1999 | Frankeny et al. | 710/132 |
| 5,953,538 * | 9/1999 | Duncan et al. | 710/22 |
| 5,982,634 * | 11/1999 | Wronski | 361/788 |

* cited by examiner

Primary Examiner—Ayaz R. Sheikh
Assistant Examiner—Raymond N Phan
(74) Attorney, Agent, or Firm—Charles A. Johnson; Mark T. Starr; Nawrocki, Rooney & Sivertson, P.A.

(57) ABSTRACT

A new distributed control mechanism for managing bi-directional interfaces of symmetrical multiprocessor systems in such a manner as to minimize the latency to storage, yet fairly distribute the use of the interfaces amongst the various components.

This bi-directional interface can be designed to perform with differing characteristics depending upon the direction of information flow. These characteristics are implemented into the control logic of the source and destination components interconnected by the bi-directional interface, thus yielding two interface behaviors using only one interface. Each component is able to track the state of the interface by using only its own request state in conjunction with the detected request state of the opposing component, when both units are operating under the joint control algorithm present in the control logic of the source and destination component. In this embodiment, there is no single bus arbiter to prioritize the bus interface transfers, rather both units on the bus operate together to schedule their own transfers based on the specific algorithm chosen for that bus interface. The joint control algorithm balances the biasing of the interfaces so that traffic in one direction is not "starved out" because of heavy traffic in the other direction. This approach also eliminates the need for transfer acknowledges which further enhances system performance and reduces unit to unit interconnections.

46 Claims, 23 Drawing Sheets

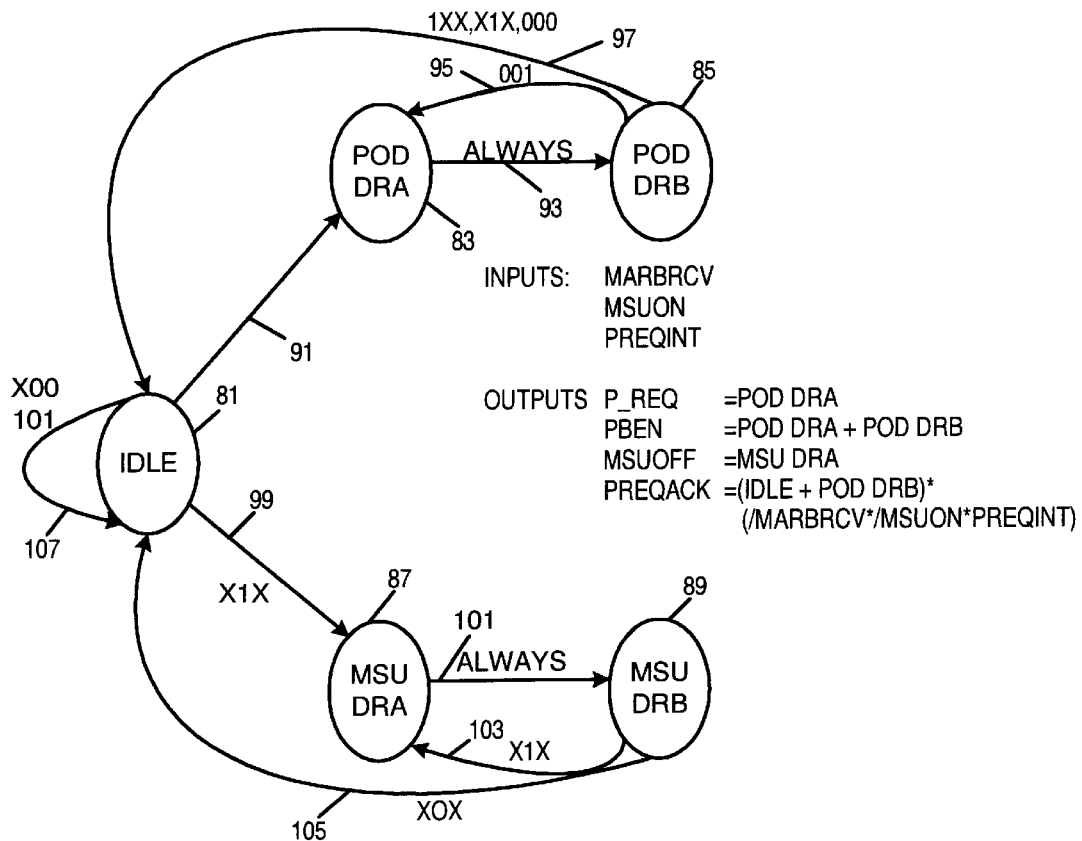

POD REQUEST TRANSMISSION AND ADDRESS BUS ENABLE - POD STATE

INPUTS:  MARBRCV
MSUON
PREQINT

OUTPUTS  P_REQ = POD DRA
PBEN = POD DRA + POD DRB
MSUOFF = MSU DRA
PREQACK = (IDLE + POD DRB)* (/MARBRCV*/MSUON*PREQINT)

| INPUTS | INPUT VECTOR BIT | DESCRIPTION |
|---|---|---|
| MARBRCV | 0 | INPUT INTERFACE MSU REQUEST (M_ARB) RECEIVE FF |
| MSUON | 1 | THE POD DETECTED IN THE MSU IS ON THE ADDRESS BUS, OR WILL BE ON THE ADDRESS BUS IN ONE CYCLE (FROM POD STATE 2) |
| PREQINT | 2 | INTERNAL POD REQUEST QUEUE LOGIC |

| OUPUTS | DESCRIPTION |
|---|---|
| P_REQ | POD REQUEST SIGNAL TRANSMITTED ACROSS BUS |
| PBEN | POD ADDRESS DRIVER OUTPUT ENABLE |
| MSUOFF | THE POD DETECTED THE MSU WILL BE OFF THE ADDRESS BUS IN ONE CYCLE (TO POD STATE 2) |
| PREQACK | ACKNOWLEDGE SIGNAL TO THE REQUEST QUEUE LOGIC, THE INTERNAL REQUEST WAS TAKEN |

FIG. 7

| INPUTS TO M ARB COUNTER | INPUT VECTOR BIT | DESCRIPTION |
|---|---|---|
| M ARB | 0 | MSU REQUEST SIGNAL TRANSMITTED ACROSS BUS (FROM MSU STATE 1) |
| IDLEONT3 | 1 | 4 CYCLES ELASPED WITHOUT AN M ARB |

| OUTPUTS FROM M ARB COUNTER | | DESCRIPTION |
|---|---|---|
| MARBONT1 | | ONE OF THE INPUTS TO ALLOWPODCOND, THE SET CONDITION FOR ALLOWPOD (TO FINAL OUTPUTS) |
| MARBONT3 | | 3M ARBS WERE TRANSMITTED (TO FINAL OUTPUTS) |

| INPUTS TO M ARBIDLE COUNTER | INPUT VECTOR BIT | DESCRIPTION |
|---|---|---|
| M ARB | 0 | MSU REQUEST SIGNAL TRANSMITTED ACROSS BUS (FROM MSU STATE 1) |

| OUTPUTS FROM M ARBIDLE COUNTER | | DESCRIPTION |
|---|---|---|
| IDLEONT1 | | ONE OF THE INPUTS TO ALLOWPODCOND, THE SET CONDITION FOR ALLOWPOD (TO FINAL OUTPUTS) |
| IDLEONT3 | | 4 CYCLES ELAPSED WITHOUT AN M ARB (TO M ARB COUNTER) |

| FINAL OUTPUTS TO OTHER MSU STATES | | DESCRIPTION |
|---|---|---|
| ALLOWPODCOND | | THE SET CONDITIONS FOR ALLOWPOD, AVAILABLE 1 CYCLE EARLIER THAN ALLOWPOD (TO MSU STATE 3) |
| ALLOWPOD | | BLOCK FUTURE MSU REQUESTS WHILE POD REQUEST WINDOW IS MADE AVAILABLE (TO MSU STATE 1, 3) |

FIG. 12C

METHOD OF AND APPARATUS FOR BANDWIDTH CONTROL OF TRANSFERS VIA A BI-DIRECTIONAL INTERFACE

CROSS REFERENCE TO CO-PENDING APPLICATIONS

The present application is related to U.S. patent application Ser. No. 09/097,287, filed Jun. 6, 1998, entitled "A Source Synchronous Transfer Scheme For A High Speed Memory Interface", and U.S. patent application Ser. No.09/096,822, filed Jun. 6, 1998, entitled "Queuing Architecture and Control System for Data Processing System Having Independently-Operative Data and Address Interfaces", both of which are assigned to the assignee of the present invention and incorporated herein by reference.

BACKGROUND OF THE INVENTION

1. Field of the Invention

The present invention generally relates to high speed data transmission within a general purpose digital computer and more particularly relates to control mechanisms for bi-directional transfer control.

2. Description of the Prior Art

Originally, digital computers were highly non-modular in construction, usually having a single hardware element for each function. Even though the required data transfer rates were relatively low, such systems tended to employ direct point-to-point interfaces between the various components.

As computer systems became more highly modularized, greater flexibility was afforded in providing the capability for configuring and reconfiguring systems to meet specific and changing requirements. Additional memory, for example, could be added as storage requirements increased. Unfortunately, as the number of modules increases, the number of interfaces (and hence the cost for interface hardware) increases geometrically, in order for each additional module to communicate within each existing module.

The current and most prevalent solution to the high cost of point-to-point interfaces for highly modular systems is through the use of common busing. In its simplest form, each module of the system is coupled to a single internal bus. Each module transfers data to other modules using that same common bus. Thus, each module within the system has a single interface (i.e., the interface to the common internal bus). As modules are added to the system, no changes and/or additions are required to the existing modules.

The major disadvantage of common busing is that the band pass of the system is limited by the band pass of the internal common bus. because all intermodule data is transferred over a shared bus. As the speed and throughput of the individual modules increase, this limitation becomes extremely severe. Eventually, a system having many high performance modules may actually decrease in performance as additional modules are added.

Some higher cost modern system employ a hybrid of point-to-point and common busing to enhance performance without unduly increasing cost. This approach then sacrifices configuration flexibility. Note that this is a partial regression to the original point-to-point approach. It is herein that the system thus becomes less flexible.

Thus, the current state-of-the-art in system design tends to employ this hybrid approach. For a typical application, the system designer maximizes performance through utilizing point-to-point interfaces for the highest demand data paths. Similarly, a common bus is used for interconnecting a larger number of lower band pass modules. In this way, maximum flexibility is retained for the lower band pass modules types, while encouraging higher performance from the higher throughput modules.

One method for increasing the overall band pass of a shared resource design is to utilize priority schemes. For example, in a typical system, a number of processors may communicate with one another across a shared bi-directional bus. However, only one of the processors may use the shared bus at any given time. Therefore, the computer system must employ a mechanism for ensuring that only one processor has access to the shared bus at any given time while blocking access of the remaining processors. Often, one or more of the processors may have a greater need to access the shared bus. One reason for this may be that one or more of the processors may be in the critical path of the computer system. If a processor is in the critical path of a computer system and it is not allowed to access the shared resource, the band pass of the entire computer system may suffer. A concrete example of this may be that a first of the processors connected to a shared bus may contain a memory therein for storing instructions which must be accessed by a main processor. A second of the processors connected to the shared bus may be responsible for controlling the I/O ports connected to a printer. It is clear that the first processor should be given priority to use the shared bus over the second processor. If this is not the case, the "band pass" of the computer system may be reduced because the second processor may have control of the bus thereby prohibiting the main processor from fetching instructions from the first processor. This is just an example of where priority schemes are essential to proper operation of modern computer systems.

One scheme advanced for solving this problem is a pure "first-in-time" priority scheme. In a pure first-in-time priority scheme, each of the processors that are coupled to the shared bus may assert a bus request signal when the corresponding processor wants to use the shared bus. The first processor that asserts the corresponding bus request signal is given priority and control over the shared bus. If a second processor asserts its corresponding bus request signal after the first processor has control over the bus, the second processor is denied access to the shared bus. After the first processor releases control of the bus, each processor is given another opportunity to obtain control of the bus by asserting its corresponding bus request signal. This process is repeated during normal operation of the computer system.

It is evident that one or more of the processors coupled to the shared resource may be effectively blocked from using the shared resource for an extended period of time. If one of these processors is in the critical path of the computer system, the band pass of the computer system may suffer. In addition, all of the processors that are coupled to the shared resource are given an equal opportunity to access the shared resource every time the shared resource is released by a processor. That is, even the processor that previously had control of the shared resource has an equal opportunity to gain control of the shared resource during the next cycle. Because of the inherent disadvantages of the pure first-in-time scheme described hereinabove, only applications that are non-bandpass limited typically use the pure first-in-time scheme. However, in these applications, the pure first-in-time scheme has the advantage of being simple to implement thereby not requiring much overhead circuitry.

A modified first-in-time scheme has been developed to reduce some of the disadvantages inherent in the pure first-in-time scheme. The modified first-in-time scheme does not allow the processor that previously had control of the shared resource to gain control of the shared resource during the next succeeding bus cycle. This modification prohibits one processor from dominating a shared resource over an extended period of time. One disadvantage of the modified first-in-time scheme is that two or more processors may still dominate a shared resource thereby effectively blocking other processors from accessing the shared resource. For this to occur, however, the two or more processors must alternate in controlling the shared resource thereby giving access to at least two of the processors coupled thereto.

In some applications, it is important that each of the users that are coupled to a shared resource be given an opportunity to access the shared resource on a periodic basis. The modified first-in-time scheme may include circuitry to prohibit a user that previous had control of the shared resource to gain control of the shared resource during the next "IN" succeeding bus cycles where N equals the number of users connected to the shared resource. In this configuration, the modified first-in-time scheme may allow all users access to the shared resource on a periodic basis.

Another priority scheme is termed the "first-in-place" scheme. The first-in-place scheme assigns a priority to each of the users connected to a shared resource. Each time an access to the shared resource is requested, the user having the highest priority assigned thereto is given access to the shared resource. For example, if a user having a priority of "2" and a user having a priority of "5" both request access to the shared resource, the first-in-place scheme will grant access to the user having the highest priority, namely the user having a priority of "2". Therefore, the users are assigned a priority value and are serviced in an order that is consistent with that value. Typically, the values assigned to the users are fixed and cannot be changed. A disadvantage of the first-in-place scheme is that the highest priority user may dominate the shared resource thereby effectively blocking access to lower priority users for extended periods of time.

One method for improving the first-in-place scheme is to rotate the assigned priority values among the users on a periodic basis. For example, a user having a priority value of "2" may be assigned a priority value of "1" and a user having a priority value of "3" may be assigned a priority value of "2". Therefore, each user is assigned a new priority value in a round robin fashion thus allowing access to the shared resource by all users on a periodic basis.

A similar approach is suggested in U.S. Pat. No. 5,195,185, issued on Mar. 16, 1993 to Marenin. Marenin suggests providing a separate processor which independently changes the priority values of all users. That is, Marenin suggests having the ability to change the priority value assigned to each user whenever the separate processor independently determines that it is necessary.

Although Marenin provides some additional flexibility to the first-in-place schemes, significant disadvantages still remain. First, the priority values of the users can only be changed at the direction of an independent processor which is not otherwise coupled to the users. Therefore, the separate processor must independently determine when a priority change should occur without regard to the current status of the users. Second, the separate processor can only load new priority values into the users at predetermined intervals. Between these intervals, the operation of the apparatus suggested in Marenin operates in the same manner as the first-in-place scheme described above.

A technique used to enhance the effectiveness of the above described priority schemes is known as the "snap-shot" technique. The snapshot technique captures the status of the resource requests signals provided by the users at a predetermined time. For example, at time T0 the resource request signal of a first user and a second user may be asserted while the resource request signal of a third user may not be asserted. If a "snap-shot" is taken at time T0, the values of the resource request signals at time T0 will be stored. If a first-in-place priority scheme is utilized, the users having an asserted captured resource request signal are serviced in the order of their assigned priority. In most systems employing the snap-shot technique, all of the users that have an asserted captured resource request signal when the previous snap-shot was taken are not allowed to access the shared resource until the next snap-shot is taken. Variations on this approach include time-shifting the snap-shot to favor one user over another.

Although the snap-shot technique may improve the effectiveness of some of the priority schemes described above, the snap-shot technique is limited by the inherent shortcomings of the underlying priority schemes.

SUMMARY OF THE INVENTION

The present invention overcomes many of the disadvantages of the prior art by providing a new distributed control mechanism for controlling bi-directional interfaces of symmetrical multiprocessor systems in such a manner as to minimize the latency to storage, yet fairly distribute the use of the interfaces amongst the various components.

In an exemplary embodiment of the present invention, the bi-directional interface can be designed to perform with differing characteristics depending upon the direction of information flow, if required by system definition. These characteristics are implemented into the control logic of the source and destination components interconnected by the bi-directional interface, thus yielding two interface behaviors using only one interface. Each component is able to track the state of the interface by using only its own request state in conjunction with the detected request state of the opposing component, when both units are operating under the joint control algorithm present in the control logic of the source and destination component. In this embodiment, there is no single bus arbiter to prioritize the bus interface transfers, rather both units on the bus operate together to schedule their own transfers based on the specific algorithm chosen for that bus interface. The joint control algorithm balances the biasing of the interfaces so that traffic in one direction is not "starved out" because of heavy traffic in the other direction. This invention also eliminates the need for transfer acknowledges which further enhances system performance and reduces unit to unit interconnections.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7 is a state diagram which describes the POD side of the address bus control, and more specifically illustrates the states where the POD is requesting and driving the bus;

FIG. 12A 12B, 12C is a state diagram describing the MSU side of the address bus control, and more specifically describes the algorithm for ensuring that a POD request window is made available;

DETAILED DESCRIPTION OF THE PREFERRED EMBODIMENTS

Figure 1A:
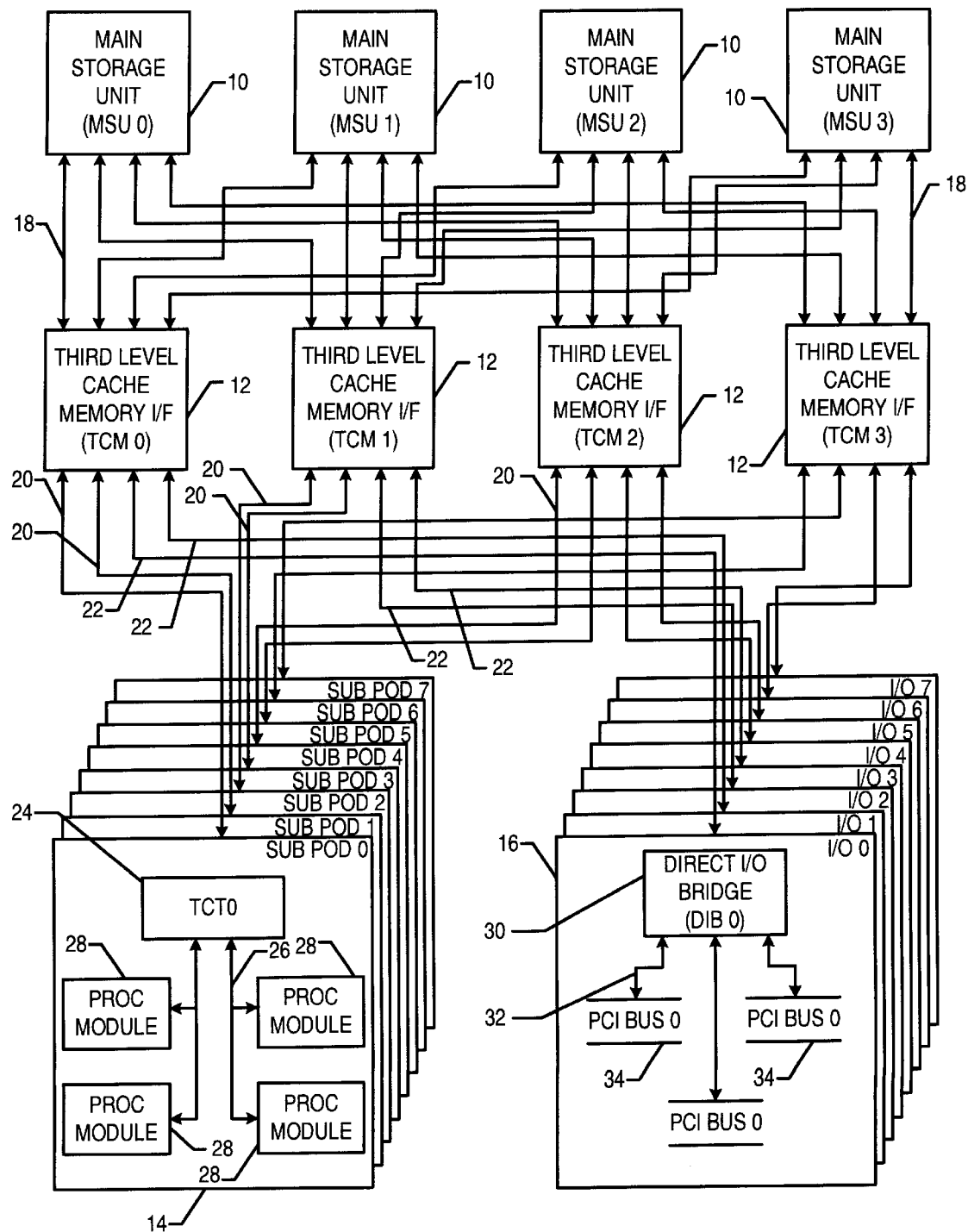
FIG. 1A is a block diagram of a system hardware platform available from Unisys Corporation in which the present invention is implemented.

FIG. 1A is a block diagram of a system hardware platform available from Unisys Corporation in which the present invention is implemented. This platform consists of up to 4 Main Storage Units called MSUs 10, up to 4 Third Level Cache Memory Interface entities called TCMs 12, up to 8 units called Sub PODs 14, and up to 8 units called I/O subsystems 16, with each I/O subsystem 16 having a Direct I/O Bridge Unit (DIB) 30.

The Main Storage Unit (MSU) 10 is a directory based coherent memory system designed to support the memory consistency models of A-Series, 2200, and UNIX/NT systems, all available commercially from Unisys Corporation. The MSU 10 is capable of supporting 1x–32x processor systems with a storage capacity of up to 32 gigabytes and a system memory bandpass exceeding 20 gigabytes/second. The MSU 10 operates in a symmetrical multi-processing environment (SMP).

Each MSU 10 is capable of storing up to 8 gigabytes of information for a total system capacity of 32 gigabytes. Also, each MSU 10 contains 16 expansion units with each expansion unit having 3 possible capacities: 128 megabytes, 256 megabytes, and 512 megabytes. Each MSU 10 has 16 semi-independent banks that share 4 double wide data busses and 8 unidirectional address busses to the synchronous dynamic random access memory (SDRAM) devices.

The system cache coherency is maintained by a central directory of all the cache lines, which is located in the MSU 10. The MSU 10 has single bit error correction and multiple bit error detection on both the data and directory storage.

Each MSU 10 is connected to each TCM 12 via a point-to-point bi-directional interface 18 that has separate address/function and data busses. The data width is 64 bits or 8 bytes for each data interface 18, while the address/function bus width is 21 bits. A source synchronous data transfer mechanism is used with the data bus that provides for a transfer rate of 200 mega transfers per second. All data information is transferred in 64 byte packets known as cache lines. It takes 4 clock cycles to transfer a cache line from the MSU 10 to the TCM 12. Therefore, each MSU/TCM interface 18 can support a peak rate of 1.6 gigabytes/sec. With a maximum of 16 such interfaces, the total peak bandwidth is 25.6 gigabytes/sec. The address/function bus portion of the interface 18 operates at a 100 mega transfers per second rate and two transfers are necessary to transfer the full address.

Figure 1B:
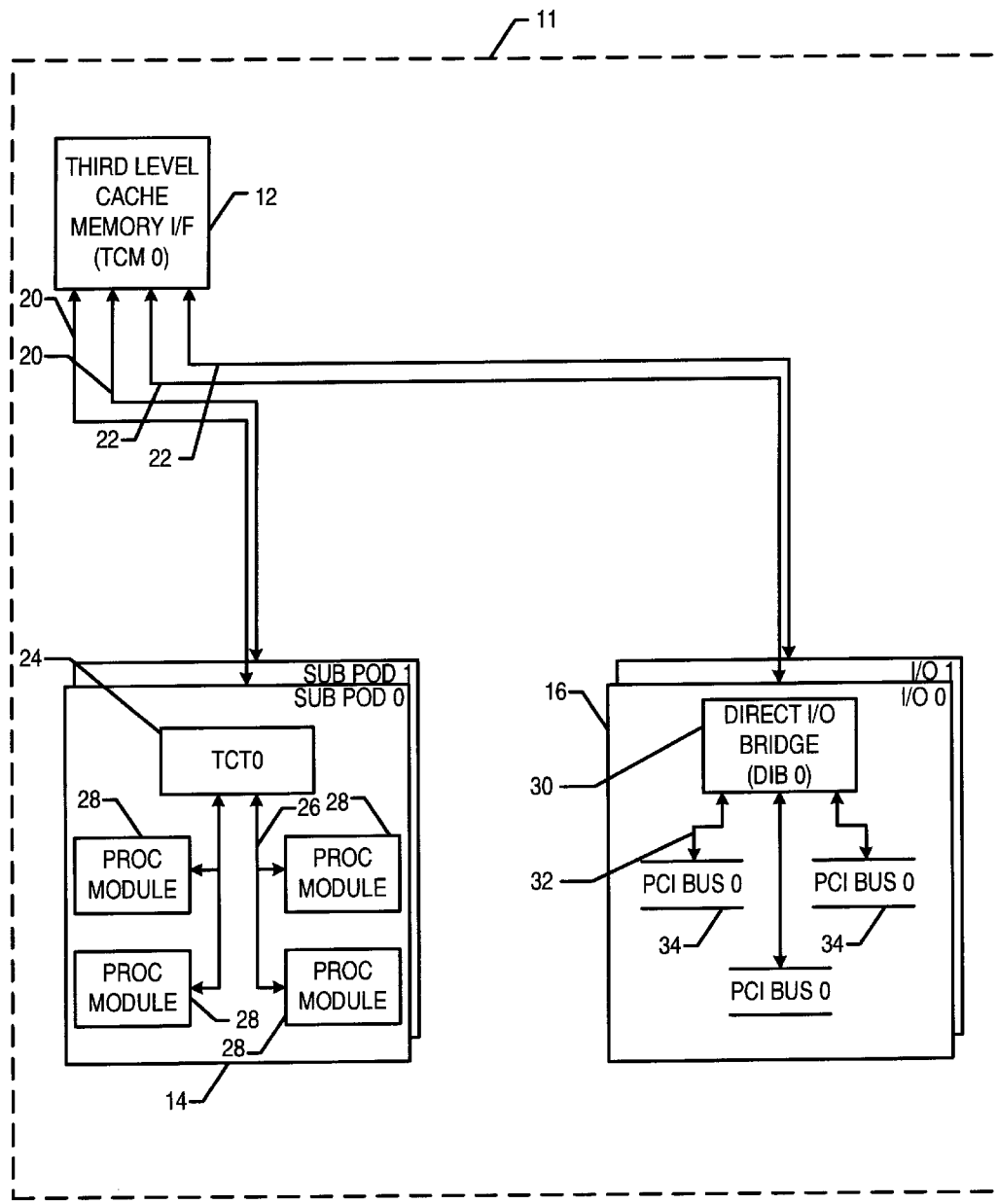
FIG. 1B is a block diagram representation of the conglomerate of the TCM, two Sub PODs, and two I/O modules (known hereinafter as a POD) within the system hardware platform.

The TCM Module 12 is basically a cross bar that connects two Sub PODs 14 and two I/O module requesters 16 to the four MSU servers 10. The conglomerate of the TCM 12, two Sub PODs 14, and the two I/O modules 16 is referred to as a POD 11 (as illustrated in FIG. 1B). The TCMs 12 are connected to the Sub PODs 14 via a point-to-point bi-directional interface 20 that has separate address/function and data busses similar to the TCM-to-MSU interface 18, and with equivalent transfer rates. However, the I/O (DIB) to TCM interface 22 has a similar logical interface as the TCMto-MSU interface 18, but operates at half the transfer rate. Both the TCM-to-MSU interface 18 (MI Bus) and the TCM-to-DIB interface 22 use a similar address control protocol, but have a different data bus control protocol. Each of these interfaces uses an algorithm optimized for its unique conditions. As an example, the MIO Bus data protocol uses one less signal and allows for multiple cache line streaming.

Each Sub POD 14 consists of a Third Level Cache Module 24, hereafter referred to as TLC, and two processor bus interfaces 26. Each processor bus interface 26 will support up to two processor modules 28. These modules 28 will either contain an IA-32 style processor, an IA-64 style processor, a 2200 style processor, or an A series processor.

Each I/O subsystem 16 consists of a DIB module 30 that interconnects up to three PCI busses 32 through interface 22 to the TCM module 12. Each PCI bus 32 can support up to 4 PCI channel modules for a total of 96 for the maximum system configuration.

Figure 2:
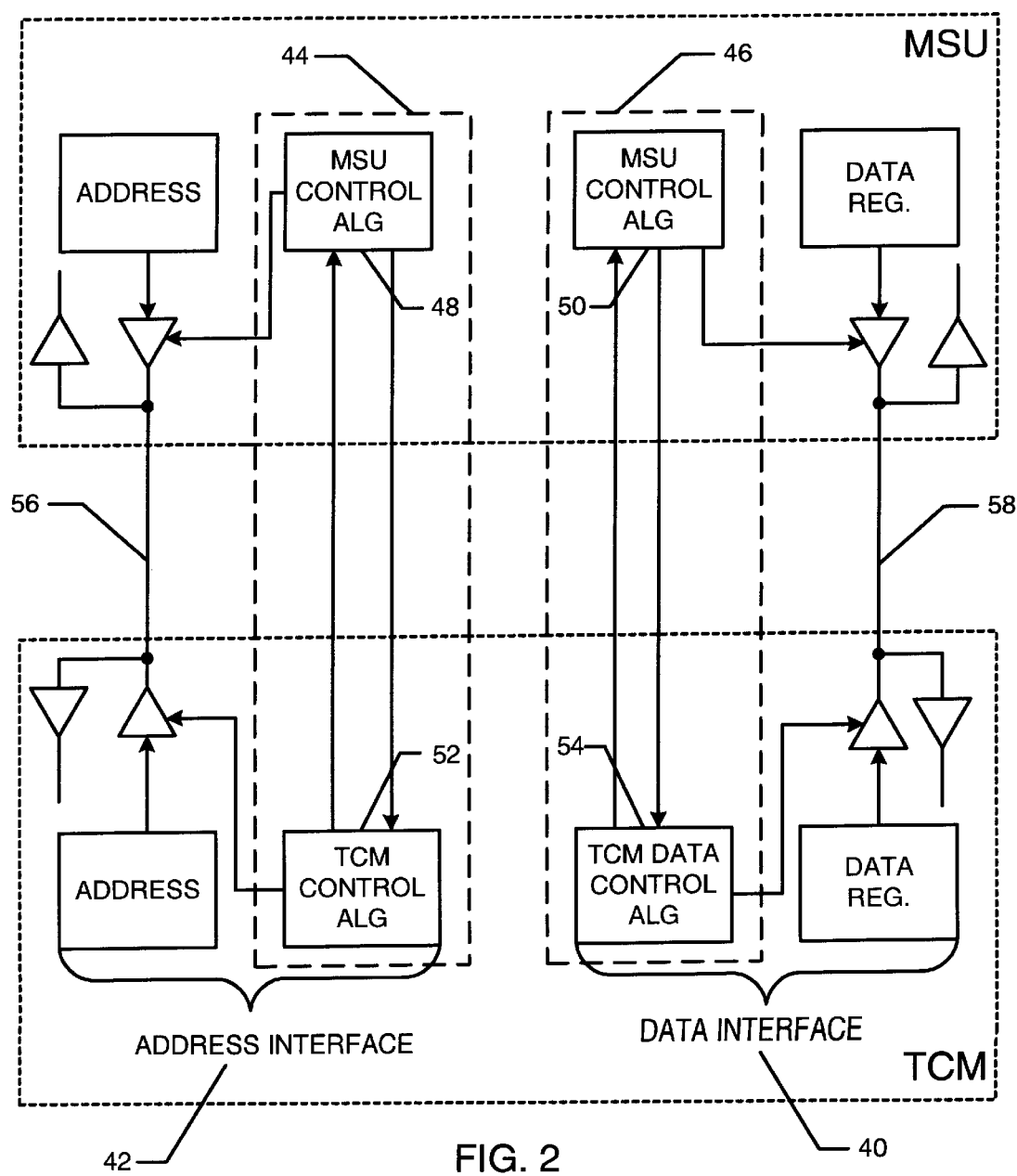
FIG. 2 is a block diagram illustrating a set of bi-directional data and address interfaces between the TCM portion of a POD and an MSU.

FIG. 2 illustrates a set of bi-directional data 40 and function/address 42 interfaces between a POD 11 and an MSU 10 in the system hardware platform. These interfaces 40 and 42 are used to provide the communication paths between each of the PODs 11 and each of the MSUs 10. The interfaces are used by the PODs 11 to make memory requests to the MSUs 10 and are used by the MSUs 10 to subsequently return memory data to the PODs 11. The MSUs 10 also must provide addresses to the PODs 11 to facilitate the return operations that force one of the PODs 11 to return updated copies of data that is requested by another POD 11 (part of the memory coherency system, described in greater detail below).

Within a set of these interfaces 40 and 42, the data 40 and address 42 interfaces operate independently (there is no rigid timing relationship between the transfer of data and the accompanying address transfer. For each interface, requests may be queued in both the MSU 10 and the TCM 12 waiting to transfer data and address information between the requesting units. The request selection and the control of the bi-directional interfaces 40 and 42 is performed by two distributed state machines 44 and 46 that are each located in part in the MSU 10, and in part in the TCM 12 (an ASIC located in the crossbar interconnect module). The address distributed state machine is contained in the MSU Control Algorithm (ALG) logic 48 and the TCM Control ALG logic 52, and the data distributed state machine is located in the MSU data control ALG logic 50 and the TCM data control ALG logic 54.

Both of the distributed state machines 44 and 46 are designed to provide control over the associated bi-directional interface 42 and 40, respectively, with a minimal amount of latency. To do this, each of the state machines 44 and 46 determines which way a set of tri-state drivers 56 and 58 for the associated interface 42 and 40 should be biased to anticipate the transfers that will be occurring next.

The distributed state machines 44 and 46 are also designed to provide control with the minimum number of control signals. The address interface 42 uses two signals, P-REQ and M-ARB, to control the operation of the address distributed state machine 44, and to bias the associated tri-state drivers 56. The data interface 40 uses the signal P_ARB, and a group of vectored signals (M-RESPONSE) to accomplish the communication between the distributed portions 50 and 54 of the data state machine 46. The vectored group of signals "M-RESPONSE" is used to return a response to the TCM 12 when the MSU 10 memory provides the TCM 12 with requested data. The signals provided on M-RESPONSE are used to correlate the data being returned by the MSU 10 memory with one of the TCM-to-memory requests. This correlation is performed using a multi-bit code called a "job number". The use of a job number is necessary because memory requests are not necessarily processed in the order in which they are received from the TCM 12, so the MSU 10 must inform the TCM 12 which request is associated with the returned data using the job number.

Both state machines 44 and 46 can balance the biasing of the interfaces 40 and 42 through sets of associated tri-state drivers 56 and 58 so that traffic in one direction is not "starved out" because of heavy traffic in the other direction. The address interface 42 always defaults to favor the POD 11. In other words, under idle conditions, the POD 11 does not have to wait for arbitration and can issue the one-cycle request signal and first cycle of address immediately on any bus cycle. The remainder of the address is transmitted on the next cycle. Also, whenever the POD 11 determines a request window is available, the request signal and the first cycle of function/address are transmitted simultaneously. The POD 11 may stream out requests on the address interface 42 continuously, as long as its TCM Control ALG logic 52 does not detect request activity from the MSU 10. If the POD 11 is active and also detects the MSU 10 requesting the address interface 42, it must complete its current request and then turn its P_ADDR_FNC drivers off. A new request from the POD 11 may need to wait until up to 3 MSU 10 request transmissions are finished, this is controlled by the MSU 10.

Requests from the MSU 10 on the address interface 42 can be made on any cycle. The request signal is active for 1 cycle. After a latency period, the address is transmitted in 2 cycles. The latency period is a minimum of 3 cycles, in order to allow detection of a POD 11 request transmission, and prevent simultaneous drive situation on the address interface 42. If a POD 11 request is detected, the MSU 10 delays the address transmission by 1 more cycle, to ensure the POD 11 address interface turnoff and MSU 10 address interface turn on do not overlap.

The requests from the MSU 10 are allowed to continue until the request queue is empty, or until the state machine 44 controlling the address interface 42 detects that 3 successive requests from the MSU 10 have been sent without allowing an intervening 4 cycle window for a POD 11 request. The MSU bus control 48 then blocks transmission of further requests until a 4 cycle window has been offered to service a POD 11 request. This algorithm ensures that 1) requests from the MSU 10 can cycle at an average of 1 request per 3 cycles (3 requests in 9 cycles) when no POD 11 requests are active, 2) POD 11 requests are not continually blocked, and 3) during periods when the POD 11 and the MSU 10 are both requesting the address interface 42, the higher priority MSU 10 requests are favored 3 to 1 over POD 11 requests.

As mentioned earlier, PODs 11 and MSUs 10 cooperate to produce a coherent memory system. This coherency scheme is based on a write-back, directory-based, ownership protocol. This means that before a POD 11 allows one of its requesters to modify data within any of its caches, it must obtain ownership permission from the MSU 10 for this data. Once ownership has been granted, the POD requesters are allowed to change the data without interacting with the MSU 10. When the POD 11 is through with the data, that is, when the data is aged out of the POD cache, it is written back to the MSU 10.

There can be up to two independent third level caches (TLCs) 24 and two I/O ports (MIOs) 16 per POD 11, and the MSU 10 keeps track of cache line state information on a third level cache (TLC) 24 and MIO 16 basis. The MSU 10 does this by using a directory structure. This directory maintains information as to whether the MSU 10, a particular TLC 24, or a particular MIO 16 owns the cache line. The directory will maintain information as to which, if any, of the TLCs 24 have outstanding copies of the cache line or if a particular I/O 16 has a coherent copy outstanding. The directory will also indicate whether a particular cache line contains an uncorrectable error.

There can be only one owner at a time and coherency is enforced on a cache line basis. This means that if another TLC 24 or MIO 16 needs to have access to the modified cache line, it is the responsibility of the MSU 10 to request the owner to return the line back to the MSU 10 so that it can route the new data to the requester. If the requester wants to modify the cache line, the original owner will purge (invalidate) the cache line from its caches. Then, if it needs access to the data again, it will be forced to go to the MSU 10 for the latest copy. If the requester just wants to read the cache line, the original owner is allowed to keep a copy of this line. In either case, the original owner has lost the privilege to modify any of the data in this line, and in order to do so, it must again request ownership rights from the MSU 10.

This coherency scheme allows multiple copies of the cache line to exist in various caches of the PODs 11. But no requester can write to these copies until they have received ownership permission from the MSU 10. If a TLC 24 determines it needs a copy of the cache line and no other TLC 24 owns the cache line, it then may get a copy from the MSU 10 directly. When one of the TLCs 24 needs to modify the data, it will request ownership from the MSU 10. The MSU 10 will then transmit a purge operation to all the TLCs 24 that have copies outstanding and grant the ownership rights to the requesting TLC 24.

MIO 16 requests to the MSU 10 are treated differently than TLC 24 type requests. In the illustrated system, the I/O bypasses the TLC 24 and is routed directly to the MSU 10. The MIO 16 does not cache its write operations. Therefore, the MSU 10 does not need to send return coherency functions to the MIO 16. That is, the MSU 10 will not send any return functions for cache lines that are being partially modified by the MIO 16. If the POD I/O is partially modifying a cache line, it will fetch the line, modify it, then automatically return it to the MSU 10. Therefore, any requests outstanding for a cache line that is being modified by the MIO 16 waits in the MSU 10 until the I/O returns the modified cache line. The MSU 10 knows the difference between a TLC 24 and an I/O request via the TLC bit in the P_ADR_FNC signal from the POD 11.

As mentioned earlier, the TCM-to-MSU interface 18 and the TCM-to-DIB interface 22 use a similar address control protocol, but have a different data bus control protocol. The TCM-to-DIB interface data bus 22 is implemented as a source-synchronous interface operating at half the primary clock frequency. There are two data transfers in one bus cycle, and the data source provides the destination with a clock signal for each data transmission. A complete data transmission takes 4 bus cycles, or 8 bus half-cycles.

The data bus of the TCM-to-DIB interface 22 always defaults to favor the TCM 12. In other words, under idle conditions, the TCM 12 does not have to wait for arbitration and can issue cycle 1 of its two-cycle response signal and first container of data immediately on any bus cycle. The rest of the data line is transmitted over the next three cycles. Also, whenever the TCM 12 determines a data response window is available, the first cycle of response and first container of data are transmitted simultaneously. The TCM 12 may stream out requests continuously, as long as its bus control does not detect DIB data request activity. One dead cycle must be inserted between data transmissions when there is a change of ownership of the bus. The data bus is at High Z state, with internal pull down resistors when not actively transferring data. Both the DIB 30 and the TCM 12 may stream up to two cache lines before releasing the bus to the other unit, if the other unit needs the bus. The TCM 12 state machine controls the number of transfers allowed on the bus. If only one requestor needs the bus, it may stream continuously without any dead cycles.

There is not a signal from the DIB 30 that directly requests the data bus of the TCM-to-DIB interface 22. The transfer of an address/function request that requires the data bus (write or message) informs the TCM 12 state machine of the DIB's 30 need for the data bus. The command field is in the second cycle of the address/function transfer. The DIB 30 may transfer up to 4 address/function requests that require the data bus, before it must wait for the first cache line to transfer on the data bus. The DIB address/function request can be made on any cycle. After a latency period, the cache line is transmitted in 4 cycles. The latency time is a minimum of 3 cycles from an idle bus, in order to allow detection of a TCM 12 response transmission, and prevent simultaneous drive situations on the data bus. The P_HOLD_DATA signal is used by the TCM 12 state machine to control the ownership of the data bus. Basically, if the P_HOLD_DATA signal is active the TCM 12 owns the data bus, but the DIB 30 must use the P_RESPONSE signals to determine if data is present on the data bus and to check data bus parity.

Figure 3:
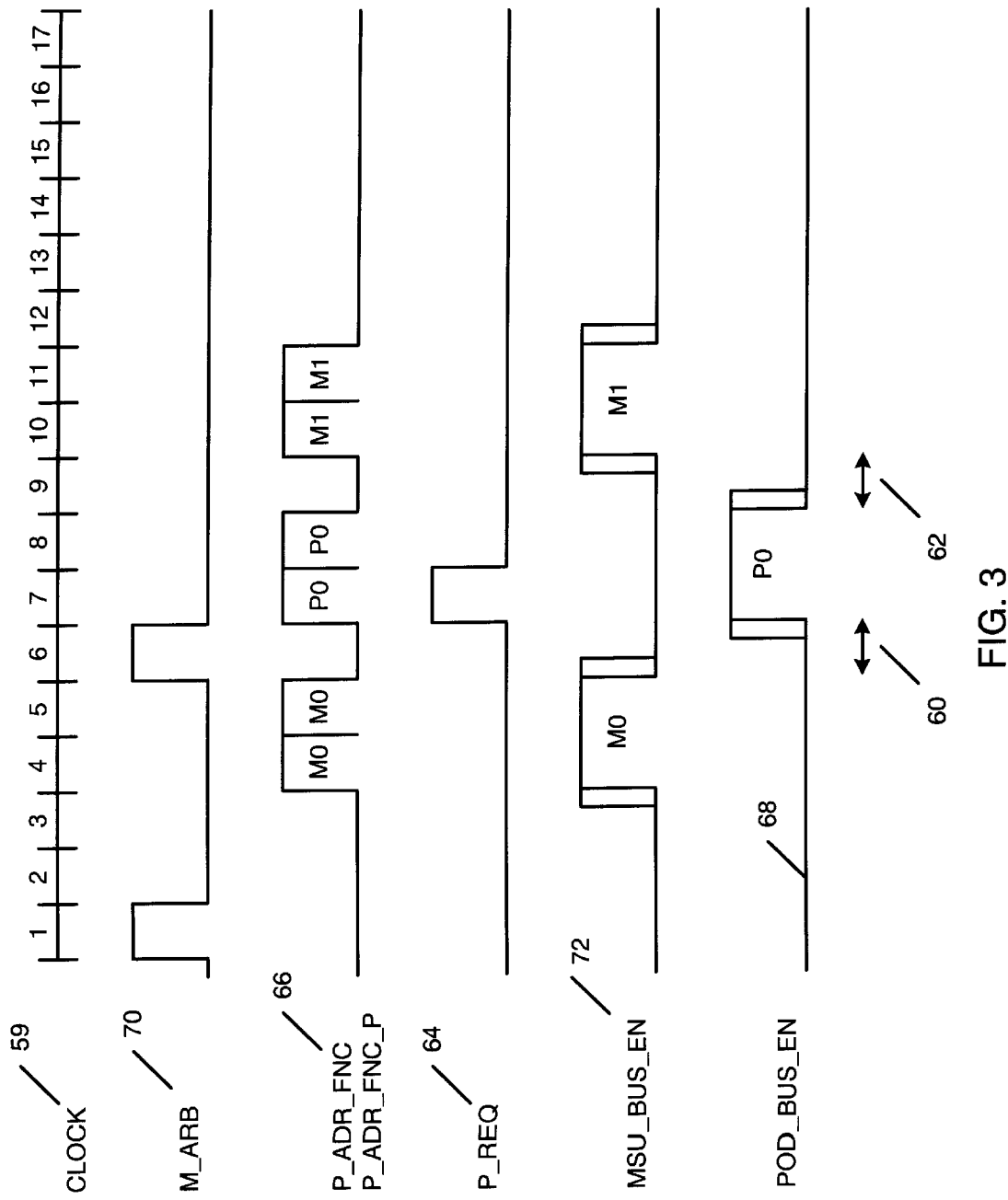
FIG. 3 is a timing diagram which illustrates that one clock cycle is needed to turn the address/function portion of the TCM-to-MSU interface around.

FIG. 3 is a timing diagram which illustrates that one clock cycle (as shown on clock cycle timeline 59) is used to turn the address/function portion 42 of the TCM-to-MSU interface 18 around. In other words, one dead cycle 60 and 62 is provided in all transmissions between the POD 11 and the MSU 10 to avoid any overlap of bus enable turn off/turn on that could result in simultaneous drive of the interface 18.

The POD request to address transmission has zero-latency. That is, the POD request (signal P-REQ 64) and first cycle of an address/function (signal vector P_ADR_FNC 66) are transmitted simultaneously (as shown at clock cycle 7 of the illustrated example (shown at 68).

The MSU request to address transmission (shown as M_ARB 70 on FIG. 3) has a minimum 3-cycle latency in order to allow the detection of a POD request that occurred the clock cycle after the MSU request. If a POD request is detected, the MSU 10 will delay the address transmission by one additional cycle to satisfy the bus turnaround requirement. As shown at clock cycle 1 of the illustrated example, an MSU request (M_ARB 70 signal goes high) is issued, and after a 3 cycle latency, the MSU address transmission occurs during clock cycles 4 and 5, as shown by signal MSU_BUS_EN 72. In another illustrated example, another MSU request (M_ARB 70 signal goes high) at clock cycle 6. This time, a POD request (shown on signal P-REQ 64) is issued on the clock cycle immediately after the MSU request (clock cycle 7). So, in this instance, the MSU 10 will delay the address transmission by one additional cycle to satisfy the bus turnaround requirement. Thus, a 4 cycle latency will occur between the issuance of the MSU request on M-ARB 70 at clock cycle 6 and the subsequent MSU address transmission on clock cycle 10.

Figure 4:
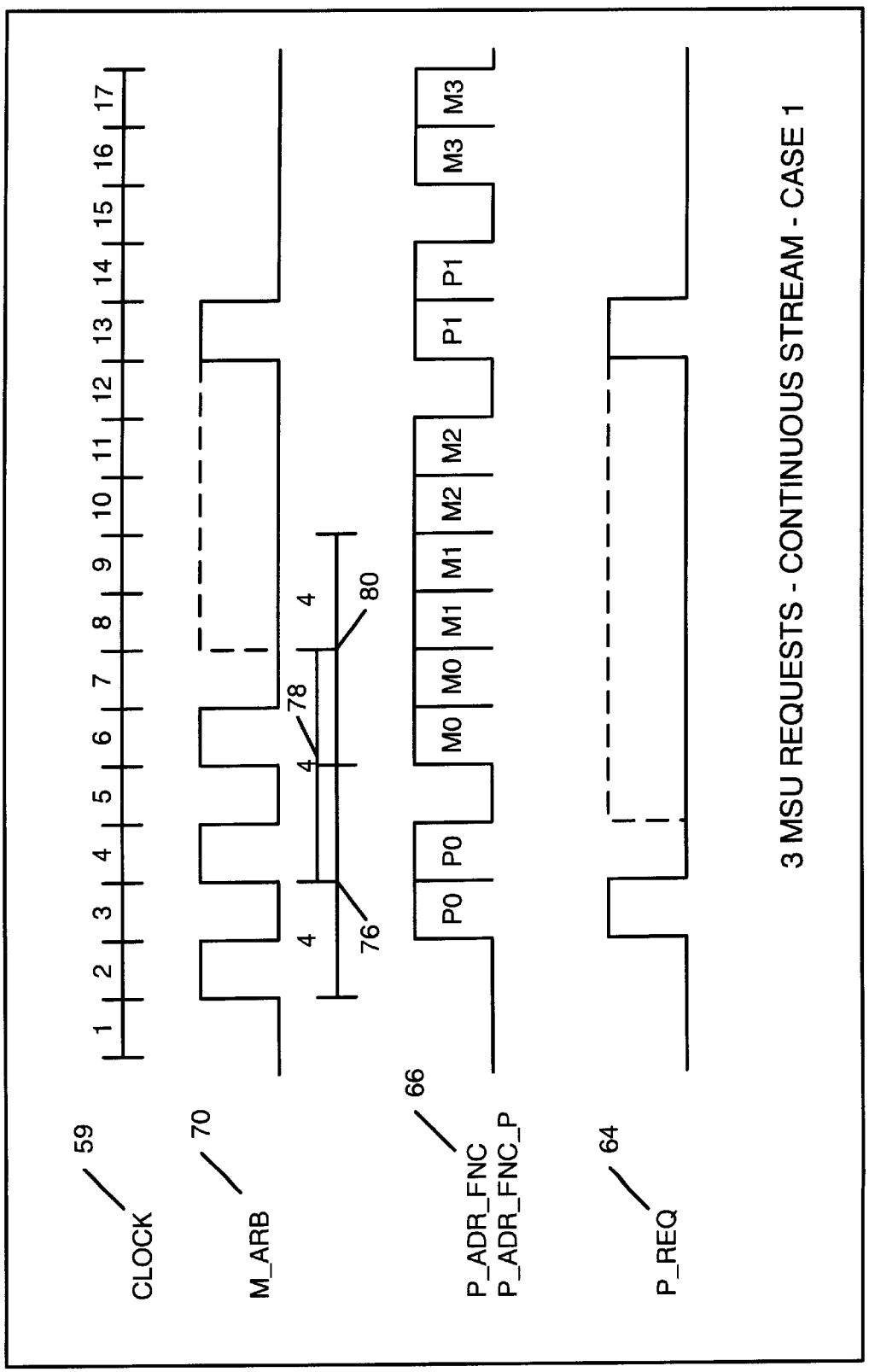
FIG. 4 is a timing diagram illustrating an example where a POD request occurs one cycle following the first of a stream of 3 MSU requests, causing the MSU to delay the address/function transmissions by one cycle. The POD releases the bus after this request, and issues another request when the MSU stream is finished.

FIG. 4 illustrates an example where 3 continuous requests from the MSU are issued, and a POD request is issued on the cycle immediately following an MSU request. All signal state transitions are shown along clock cycle timeline 59. As mentioned earlier, a POD 11 may stream requests without intervention, unless an MSU request is detected. If an MSU request is detected, then the POD 11 must finish the current request and get off the bus. The MSU 10 may stream up to 3 requests without intervention, and special handling of the MSU address transmission is required when a POD request is made the cycle following an MSU request. If the MSU 10 has to delay the address cycle for the first request due to this condition, then the address cycles for the second and third request in a continuous stream will also each be delayed by the extra cycle.

This is illustrated at clock cycles 2, 4 and 6 where 3 successive MSU requests are issued (on signal M_ARB 70), and a POD request (signal P_REQ 64) is issued at clock cycle 3, one cycle after the first of the 3 successive MSU requests. As shown in this example, the MSU 10 delays the issuance of the address for 4 cycles following the first request (as shown at 76), and also delays the issuance of the address for the second and third MSU requests for an extra clock cycle (total of 4 clock cycles) on each request (as shown at 78 and 80).

Figure 5:
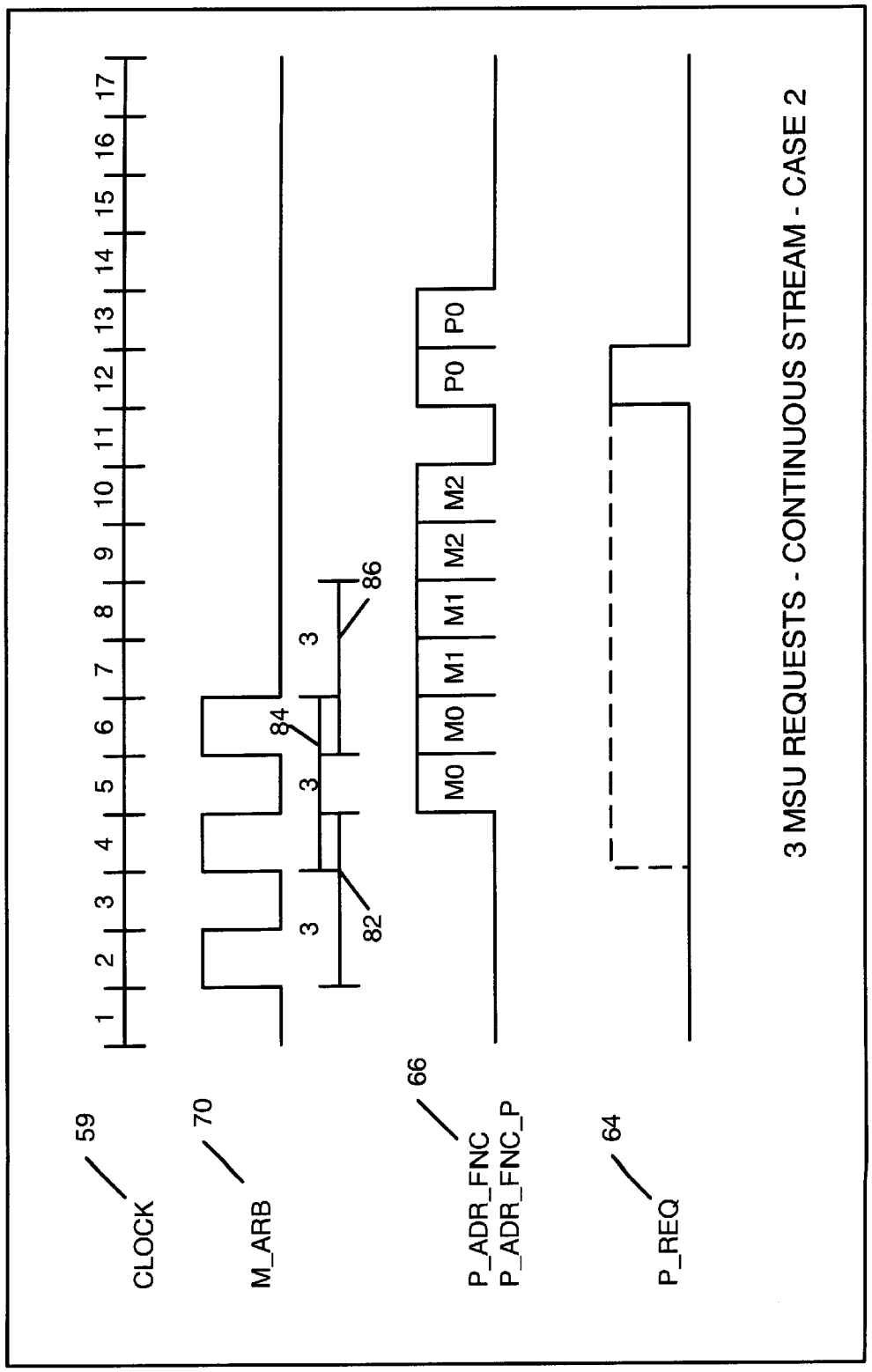
FIG. 5 is a timing diagram illustrating a scenario where three successive MSU requests are issued, and no POD request occurs on the second cycle of the MSU request sequence.

FIG. 5 illustrates a scenario where three successive MSU requests are issued, and no POD request occurs on any second cycle of any MSU request. This is in contrast to FIG. 4, where a POD request did occur on cycle 2 of an MSU request sequence. In this case, no MSU address cycles are delayed if no POD request occurs on cycle 2 of the MSU request sequence. Here, 3 successive MSU requests (signal M-ARB 70) are issued on clock cycles 2, 4, and 6. No POD request (signal P_REQ 64) is issued on the second cycle of any of the MSU requests (clock cycles 3, 5 and 7) and, in fact, the POD request does not occur until clock cycle 12 in the illustrated scenario. This is because the POD has detected MSU activity and is not allowed to initiate a request under the rules of the joint control algorithm. Here, no extra cycle needs to be added to the standard 3 cycle latency between a MSU request and subsequent address transmission (shown at signal P_ADR_FNC 66) for any of the three successive MSU requests. The first MSU request at cycle 2 is followed by a standard 3 cycle latency (shown at 82) such that the address is transmitted beginning on cycle 5. In a similar manner, the second MSU request at cycle 4 is followed by a standard 3 cycle latency (shown at 84) such that its corresponding address is transmitted beginning at cycle 7. Finally, the third MSU request at cycle 6 is followed by a standard 3 cycle latency (shown at 86) such that its corresponding address is transmitted beginning at cycle 9.

Figure 6:
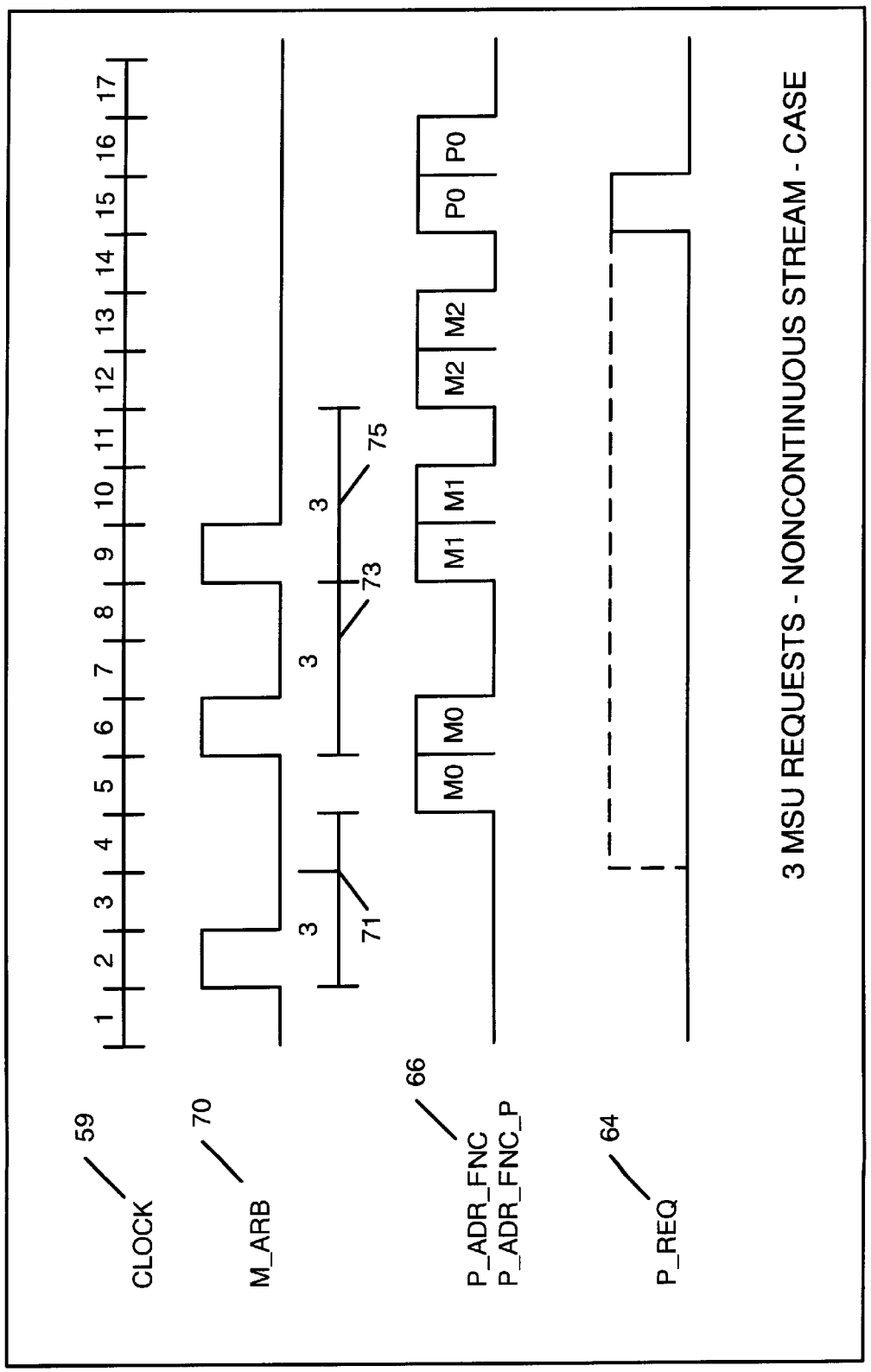
FIG. 6 is a timing diagram illustrating a scenario where gaps of two or more cycles exist between successive requests from the MSU request priority queue logic.

FIG. 6 illustrates a variation of FIG. 5, where the MSU request stream is not continuous, but the POD is not allowed to issue a request while it detects MSU activity. In the illustration, there is a three cycle gap delay (shown at 71) between the first MSU request at clock cycle 2 and the second MSU request at clock cycle 6 (shown on signal M_ARB 70). Thus, there is a standard 3 cycle delay (shown at 73 and 75, respectively) between the second MSU request at cycle 3 and its corresponding address transmission at cycle 9, and the third MSU request at cycle 9 and its corresponding address transmission at cycle 12.

If the MSU 10 has made 3 requests and has not allowed an open 4 cycle bus window, it must get off the bus for at least 4 cycles in order to allow a possible POD request to get through. This is done even if a POD request had slipped in on cycle 2 of the first MSU request, otherwise once the MSU requests commence, future POD requests could get blocked out for an indefinite time.

FIG. 7 is a state diagram which describes the POD side of the address bus control, and more specifically illustrates the states where the POD is requesting and driving the bus. Beginning at the idle state 81, if an internal POD request is received from the request queue logic, control passes via interface 91 to state POD DRA 83. If, at the idle state 81, the POD detected the MSU is on the address bus, control passes via interface 99 to state MSU DRA 87. If neither of the above two conditions is encountered at the idle state 81, control will loop back to the idle state via interface 107.

From state POD DRA 83, control always passes to POD DRB 85 via interface 93. Likewise, from state MSU DRA 87, control always passes to MSU DRB 89 via interface 101.

From state POD DRB 85, control will pass back to state POD DRA 83 if an internal POD request is received from the request queue logic, otherwise control will pass back to the idle state 81 via interface 97.

From state MSU DRB 89, control will pass back to state MSU DRA 87 via interface 103 if the POD detected the MSU is on the address bus, or will be on the address bus in one cycle. Otherwise, control will pass back to the idle state 81 via interface 105.

Figure 8:
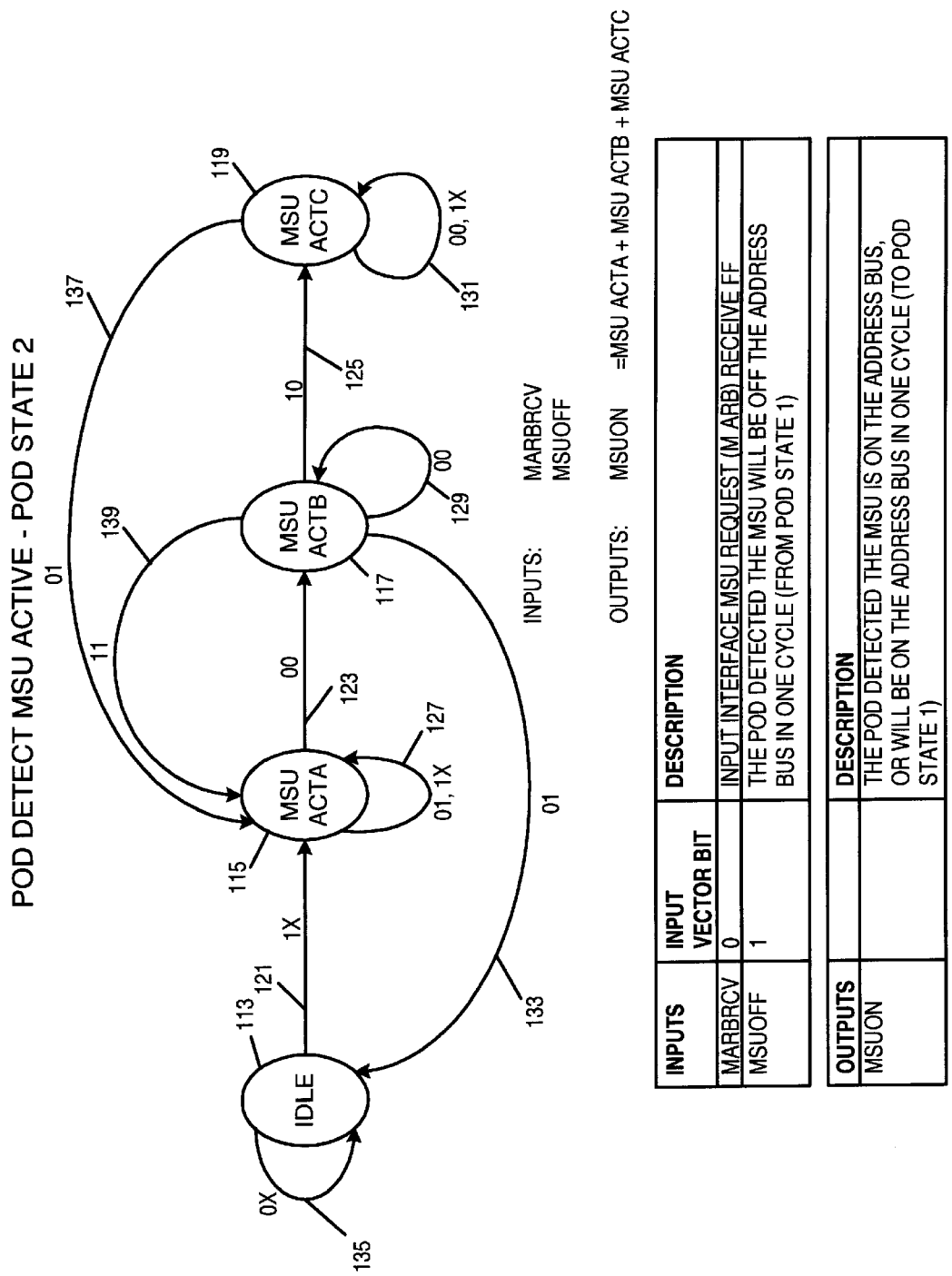
FIG. 8 is a state diagram which describes the POD side of the address bus control, and more specifically illustrates the states derived from the MSU M-ARB signal.

FIG. 8 is a state diagram which describes the POD side of the address bus control, and more specifically illustrates the states derived from the MSU M-ARB signal. The POD creates its own copy of the MSU drive states by sampling the inbound M_ARB signal.

Beginning at idle state 113, control will pass to state MSU ACTA 115 via interface 121 if input interface MSU request 121 goes high. Otherwise, control will loop back to the idle state 113 via interface 135.

At state MSU ACTA 115, control will pass to state MSU ACTB 117 via interface 123 if there is no input interface MSU request AND the POD did not detect that the MSU will be off the address bus in one cycle. Otherwise, control will loop back to state MSU ACTA 115 via interface 127.

At state MSU ACTB 117, control will pass to state MSU ACTC 119 via interface 125 if there is an input interface MSU request AND the POD did not detect the MSU will be off the address bus in one cycle. Otherwise, control will loop back to state MSU ACTB 117 via interface 129 if there is no input interface MSU request AND the POD did not detect that the MSU will be off the address bus in one cycle. However, if there is an input interface MSU request AND the POD detected that the MSU will be off the address bus in one cycle, control will pass back to state MSU ACTA via interface 139. If there is no interface MSU request AND the POD did detect that the MSU will be off the bus in one cycle, control will return to the idle state via interface 133.

At state MSU ACTC 119, control will pass to state MSU ACTA via interface 137 if there is no input interface MSU request AND the POD did detect the MSU will be off the address bus in one cycle. Otherwise, control will loop back to state MSU ACTC 119 via interface 131.

Figure 9:
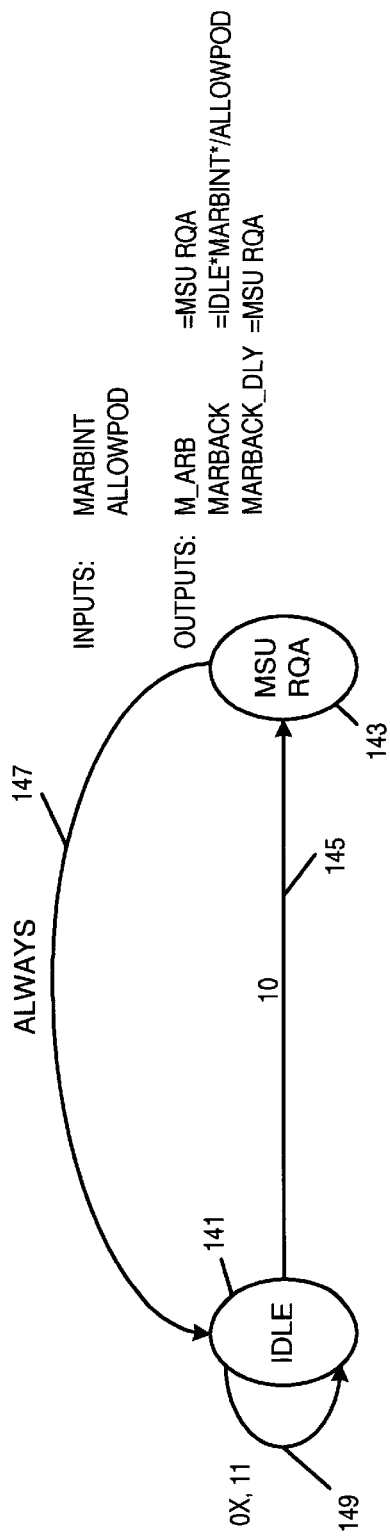
FIG. 9 is a state diagram describing the MSU side of the address bus control, and more specifically describes the MSU request signal states.

FIG. 9 describes the MSU side of the address bus control, and more specifically describes the MSU request signal states. Starting at the idle state 141, control will pass to state MSU RQA 143 via interface 145 if an internal MSU request is issued from the request queue logic AND there is no block of future MSU requests while the POD request window is made available. Otherwise, control will loop back to the idle state 141 via interface 149.

At state MSU RQA, control will always pass back to the idle state 141 via interface 147.

Figure 10:
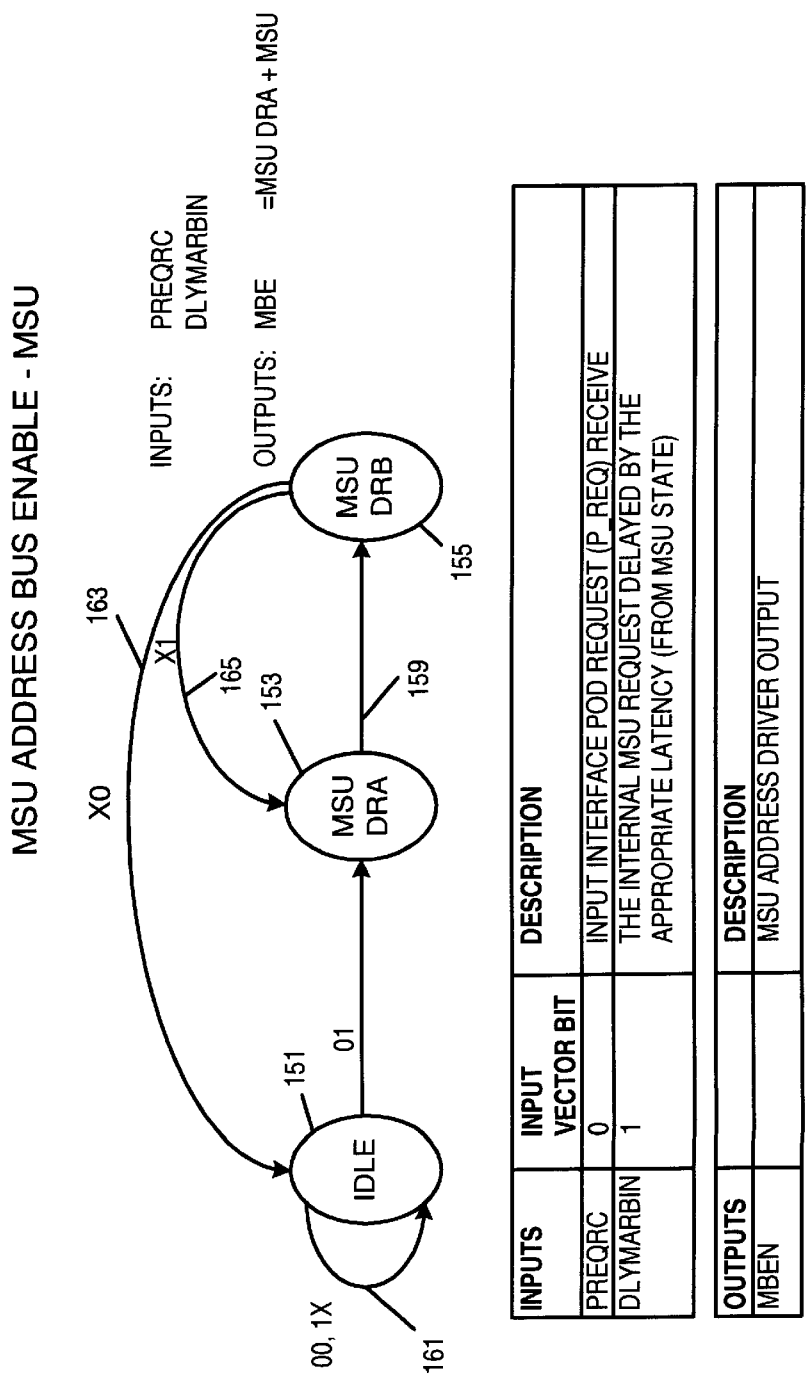
FIG. 10 is a state diagram describing the MSU side of the address bus control, and more specifically refers to the MSU address bus drive states.

FIG. 10 describes the MSU side of the address bus control, and more specifically refers to the MSU address bus drive states. Beginning at idle state 151, control passes to the MSU DRA state 153 when there is no POD request but there is an internal MSU request delayed by the appropriate latency. Otherwise, control loops back to the idle state 151 through interface 161.

At state MSU DRA 153, control will always pass to state MSU DRB 155 through interface 159. At state MSU DRB, control will pass to state MSU DRA 153 via interface 165 if there is an internal MSU request delayed by the appropriate latency, otherwise control will pass to idle state 151 via 163.

Figure 11:
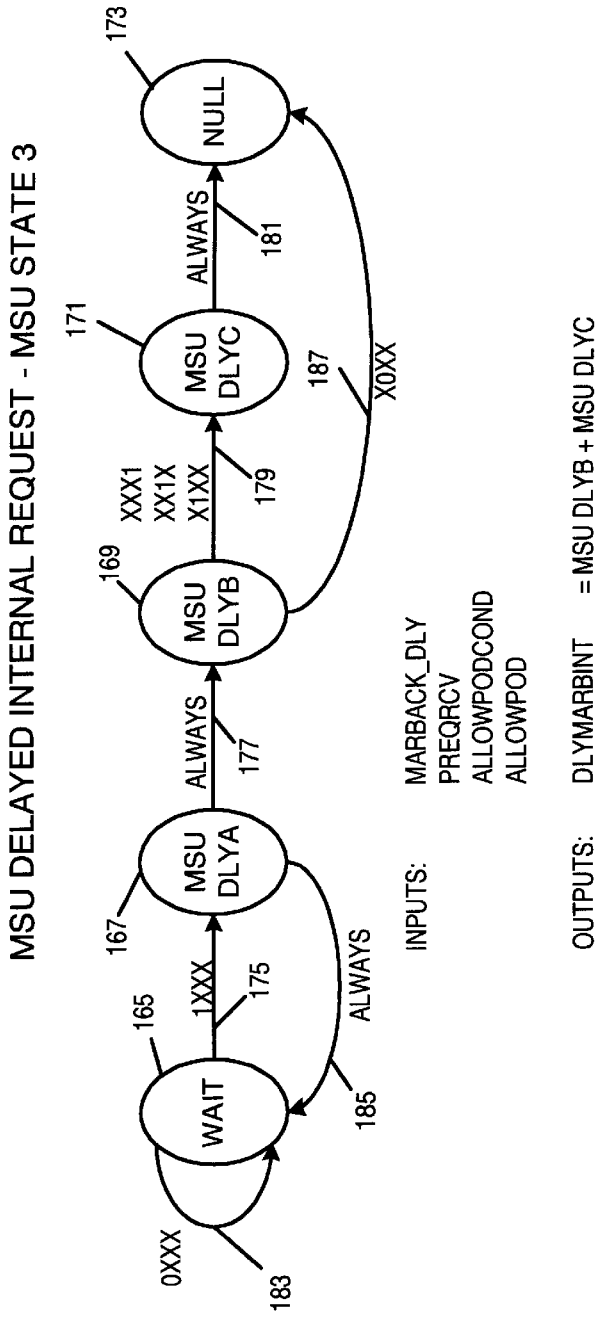
FIG. 11 is a state diagram describing the MSU side of the address bus control, and more specifically describes the control of the request/address latency.

FIG. 11 describes the MSU side of the address bus control, and more specifically describes the control of the request/address latency. Beginning at the wait state 165, control passes to state MSU DLYA 167 via interface 175 when the internal request was taken (from MSU State 1).

At state MSU DLYA 167, control will always pass to state MSU DLYB 169 via interface 177. Additionally, control will also always pass back to the wait state 165 via interface 185.

At state MSU DLYB 169, control will pass to state MSU DLYC via interface 179 when either 1) there is an input interface POD request; OR 2) the signal ALLOWPOD-COND goes high (the set conditions for ALLOWPOD, available 1 cycle earlier than ALLOWPOD); OR the signal ALLOWPOD goes high (which will block future MSU requests while the POD request window is made available). However, if the input interface POD request goes low, control will pass via interface 187 to the null state 173.

At state MSU DLYC 171, control will always pass to the null state 173 via interface 181.

Figure 12A:
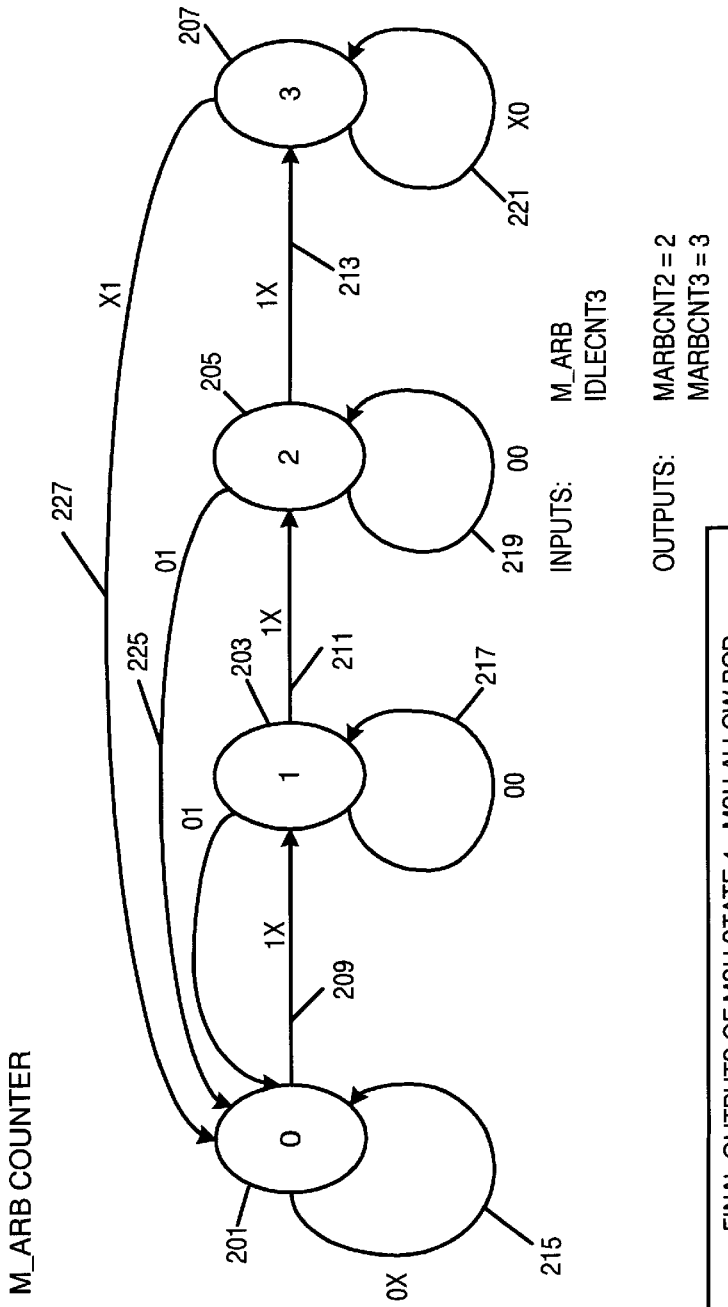
Figure 12B:
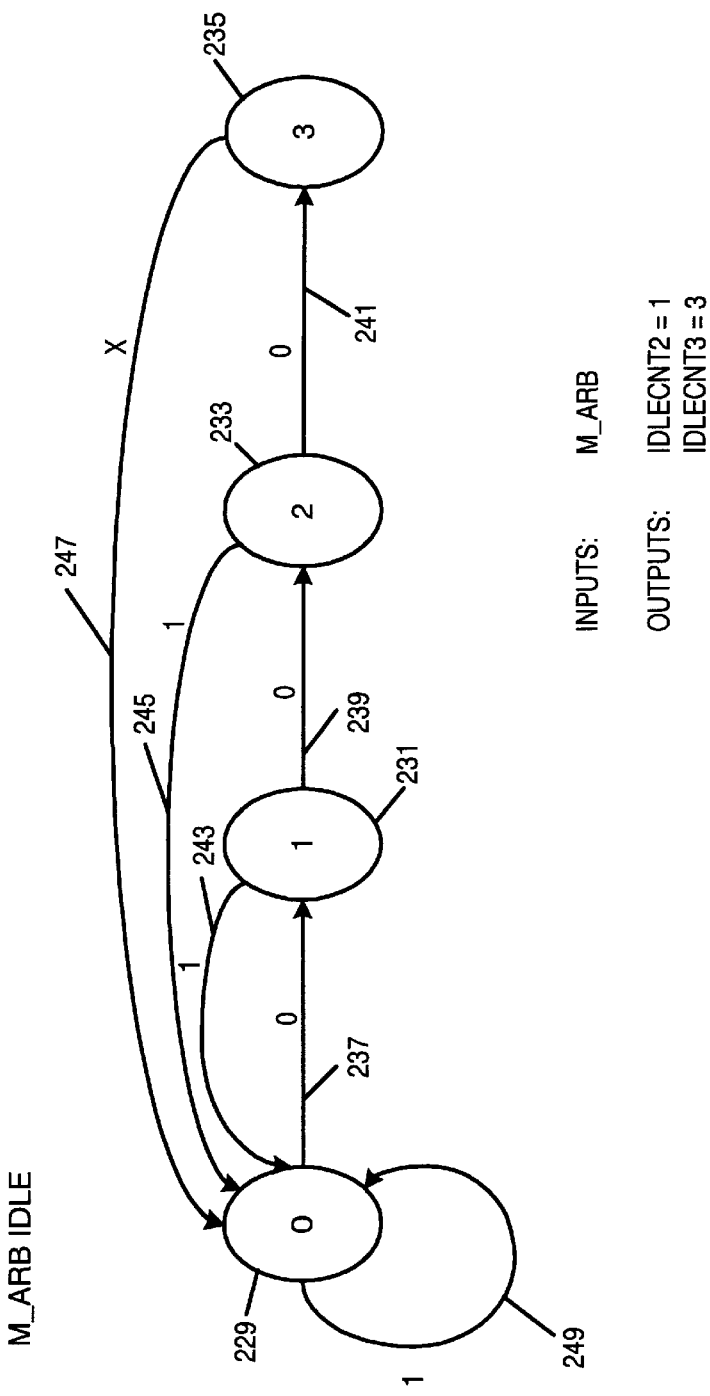

FIGS. 12A, 12B, and 12C describes the MSU side of the address bus control, and more specifically describes the algorithm for ensuring a POD request window is made available.

Referring to FIG. 12A, beginning at state 201, control will pass to state 203 via interface 209 if the M_ARB signal (MSU request) is high, otherwise control will loop back to state 201.

At state 203, control will pass to state 205 via interface 211 if the M_ARB signal (MSU request) is high, otherwise control will pass back to state 201 if the IDLECNT3 input is high AND M_ARB signal is low, and state 203 if the IDLECNT3 input is low, AND M_ARB signal is low.

At state 205, control will pass to state 207 via interface 213 if the M_ARB signal (MSU request) is high, otherwise control will pass back to state 201 if the IDLECNT3 input is high AND M_ARB signal is low, and state 205 if the IDLECNT3 input is low, AND M_ARB signal is low. At state 207, control will pass back to state 201 if the IDLECNT3 input is high, and state 207 if the IDLECNT3 input is low.

Referring now to FIG. 12B at state 229, control will pass to state 231 via interface 237 if the M_ARB signal (MSU request) is low, otherwise control will loop back to state 229 via interface 249 if the M_ARB signal is high.

At state 231, control will pass to state 233 via interface 239 if the M_ARB signal is low, otherwise control will pass back to state 229 via interface 243 if the M_ARB signal is high.

At state 233, control will pass to state 235 via interface 241 if the M_ARB signal is low, otherwise control will pass back to state 229 via interface 245 if the M-ARB signal is high. At state 235, control will always pass to state 229 via interface 247.

FIG. 12C is a table describing the inputs and outputs for the state diagrams shown in FIG. 12A and FIG. 12B. Referring back to FIG. 2, the POD/MSU data bus control algorithm will now be described. The term "bus cycle" refers to the primary POD/MSU clock period, and the term "bus half-cycle" refers to the data transfer period, or the time required to transfer 1 container, or 64 bits, of data across the bus. The data bus of the current invention is implemented as a source-synchronous interface operating a twice the primary clock frequency. There are two data transfers in 1 bus cycle, and the data source provides the destination with a clock signal for each data transmission. A complete data transmission takes 4 bus cycles, or 8 bus half-cycles.

The data interface 40 always defaults to favor the MSU 10. In other words, under idle conditions, the MSU 10 does not have to wait for arbitration and can issue cycle 1 of its two-cycle response signal and first container of data immediately on any bus interface cycle. The rest of the data lines are transmitted over the next three cycles. Also, whenever the MSU 10 determines a data response window is available, the first cycle of the response and first container of data are transmitted simultaneously. The MSU 10 may stream out requests continuously, as long as its bus control does not detect POD data request activity. If the MSU 10 is active and also detects the POD 11 requesting the bus, it must complete its current response and then turn its P_DATA drivers off. A new MSU response may be sent after the POD data request is satisfied.

The POD data request can be made on any cycle. The request signal is active for 1 cycle. After a latency period the data line is transmitted in 4 cycles. The latency time is a minimum of 3 cycles, in order to allow detection of an MSU response transmission, and prevent a simultaneous drive situation on the data interface 40. Depending on the relationship of the POD data request and the MSU response, the POD 11 may need to delay the data transmission by up to 6 cycles. The POD 11 may issue a new data request on the cycle after the last data container transmission of the current data request. The POD 11 therefore cannot stream out data requests, but is restricted to a maximum repetition rate of 1 request every 7 cycles. This rate is adequate for data transfers in the POD to MSU direction, based on system definition requirements.

Figure 13:
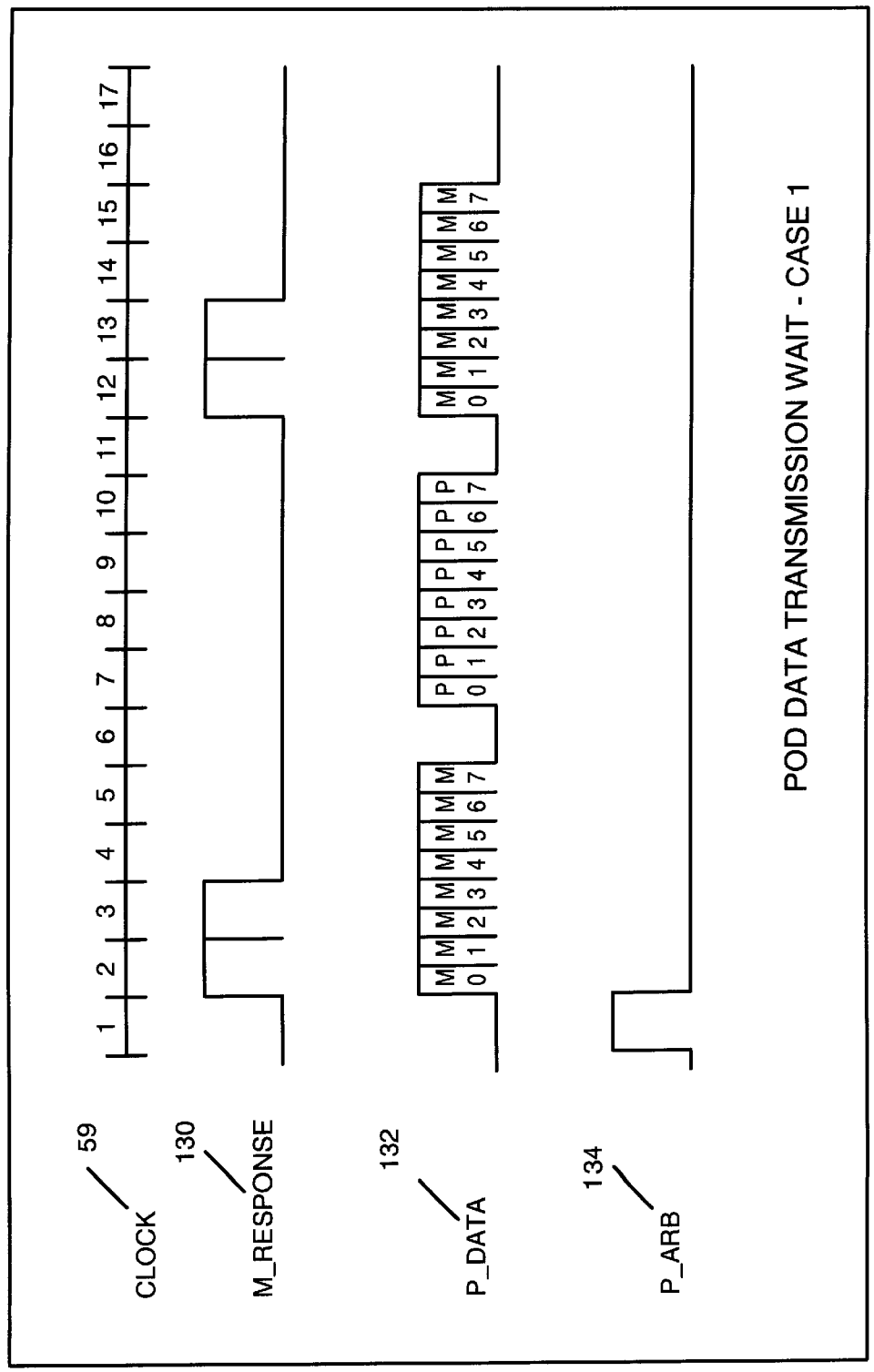
FIG. 13 is a timing diagram illustrating a data bus transfer where there is a six cycle latency between a POD request signal and the corresponding data transmission.

FIG. 13 illustrates a data bus transfer where there is a six cycle latency between a POD request signal and the corresponding data transmission. All signal state transitions are shown along clock cycle timeline 59. One clock cycle is used to turn the bus around. In other words, one dead cycle is provided between POD/MSU transmissions to avoid any overlap of data interface 40 turn on/ turn off that could result in simultaneous drive of the data interface 40.

The MSU response signal to data transmission has zero latency. Thus, the first cycle of the MSU response signal and the first cycle of data are transmitted simultaneously. The POD request signal to data transmission has a minimum 3-cycle latency in order to allow the detection of an MSU response that occurred the clock cycle after the POD request. If an MSU response is detected, the POD 11 will delay the data transmission by up to three additional cycles to satisfy the bus turnaround requirement.

In the illustration, a POD request signal (P_ARB 134) is transmitted on clock cycle 1. An MSU response signal (M_RESPONSE 130) is issued beginning on clock cycle 2. Since an MSU response occurred on the clock cycle after the POD request, the POD data transmission latency period will be extended for three additional clock cycles beyond the minimum 3 cycle latency (for a total of 6 clock cycles). Thus, the POD data transmission on signal P-DATA 132 will not occur until clock cycle 7.

The first cycle of MSU data (P_DATA 132) is transmitted simultaneously with the MSU response signal (M_RESPONSE 130) generated on clock cycle 2. The entire data transmission for this MSU response signal takes 4 clock cycles (clock cycles 2, 3, 4, and 5).

Figure 14:
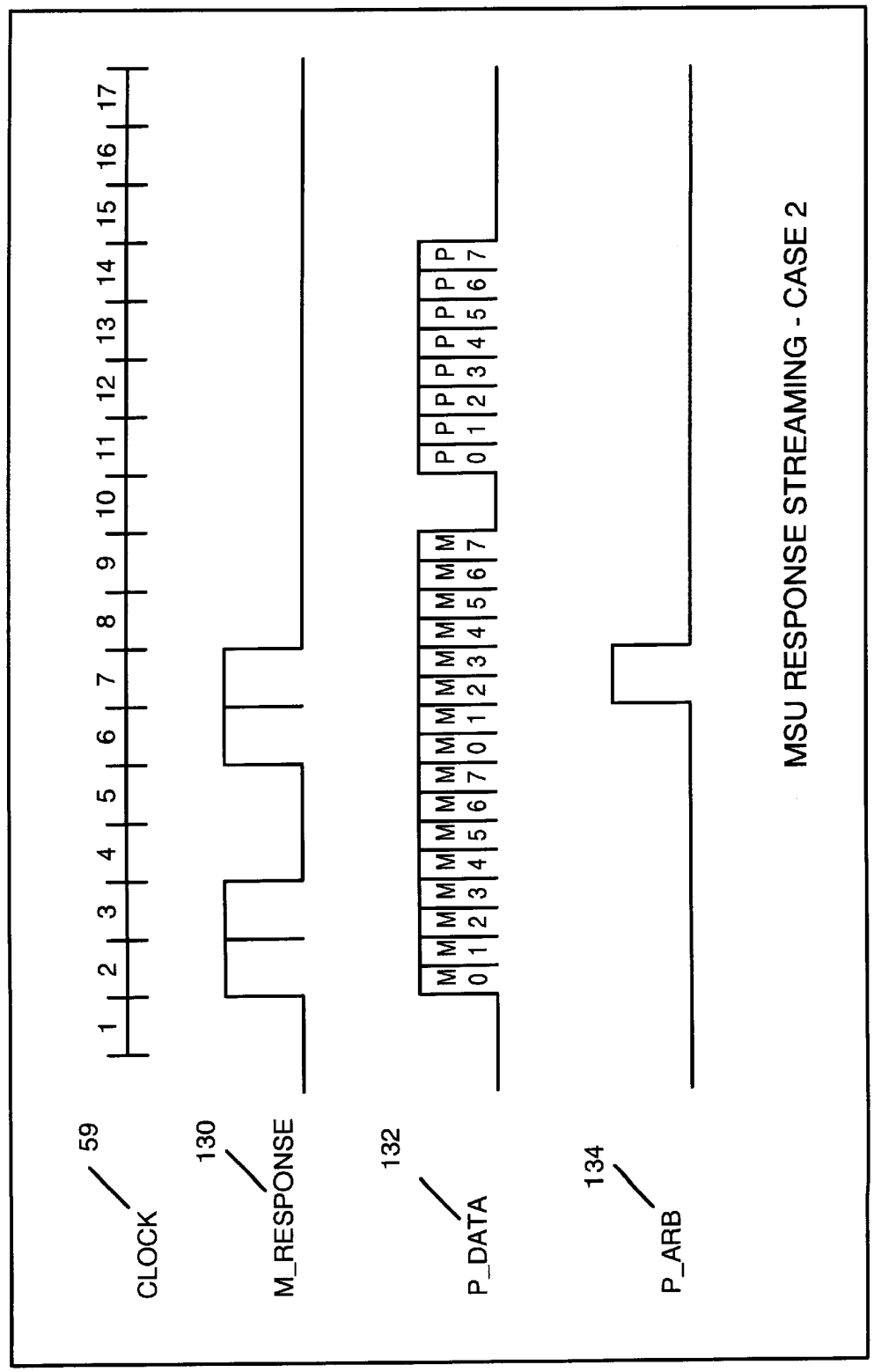
FIG. 14 is a timing diagram illustrating that the data bus may stream MSU responses without intervention, unless a POD request is detected.

FIG. 14 illustrates that the data interface 40 may stream MSU responses without intervention, unless a POD request is detected. If a POD request is detected, the MSU must finish the current response then get off the bus. As shown in FIG. 14, the first cycle of an MSU response signal (M_RESPONSE 130) is generated during clock cycles 2 and 6. The first cycle data transmissions on P_DATA 132 corresponding to the MSU response signals are transmitted simultaneously with the response signals. Thus, the first MSU data transmission occurs during clock cycles 2, 3, 4, and 5, and the second MSU data transmission occurs during clock cycles 6, 7, 8, and 9. Note that these two MSU data transmissions are streamed without intervention. During the second MSU data transmission, a POD request signal (on P_ARB 134) is generated on clock cycle 7. In this instance, there is a 4-cycle latency between the POD request signal and the corresponding POD data transmission, since the MSU data transmission currently underway will require 3 cycles to complete, and there must be one additional cycle of latency added to allow the bus to turn around properly between the MSU and POD data transmissions. Thus, the POD data transmission on P_DATA 132 will begin on clock cycle 11.

Figure 15:
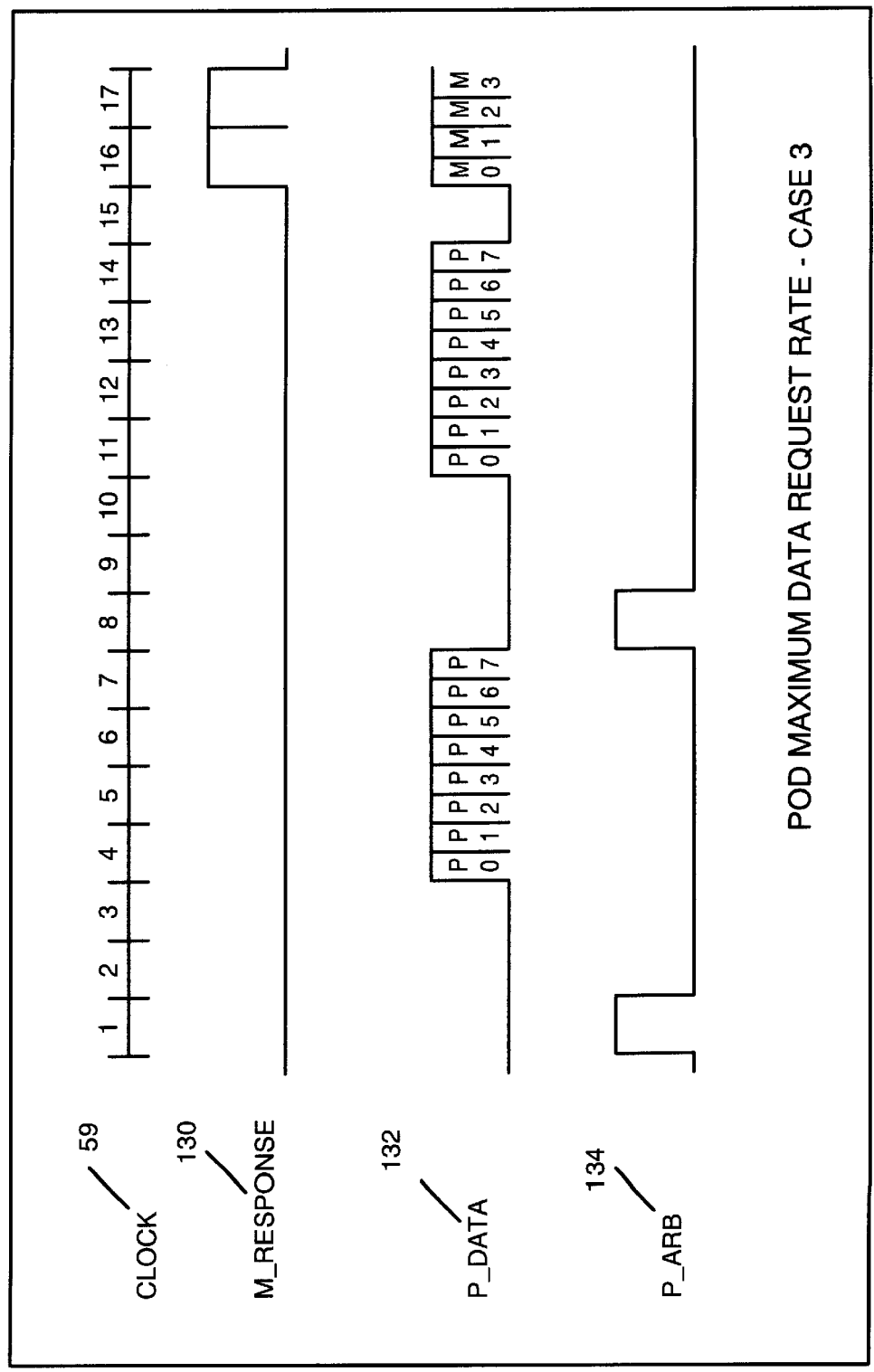
FIG. 15 is a timing diagram which illustrates that the POD, unlike the MSU, cannot stream data requests on the data bus.

FIG. 15 illustrates that the POD, unlike the MSU, can not stream requests on data interface 40. A new POD data request may be transmitted only after the last container of data was transmitted for the current data request. This means the fastest repetition rate for POD data requests is 1 request every 7 clock cycles. In FIG. 15, a POD data request is issued on P_ARB 134 during clock cycle 1. The POD request to data transmission has a minimum 3-cycle latency in order to allow the detection of an MSU response that occurred the clock cycle after the POD request. Thus, the POD data transmission may not begin on P-DATA 132 until clock cycle 4. A second POD request is issued on P_ARB 134 during clock cycle 8, immediately following the completion of the data transmission for the first POD request at clock cycle 7. Since the POD 11 may not stream requests, the data transmission for this second POD request may not begin until clock cycle 11. This illustration shows that the fast possible repetition rate for POD data requests is 1 request every 7 clock cycles (in this instance, POD requests were generated during clock cycles 1 and 8.

Figure 16:
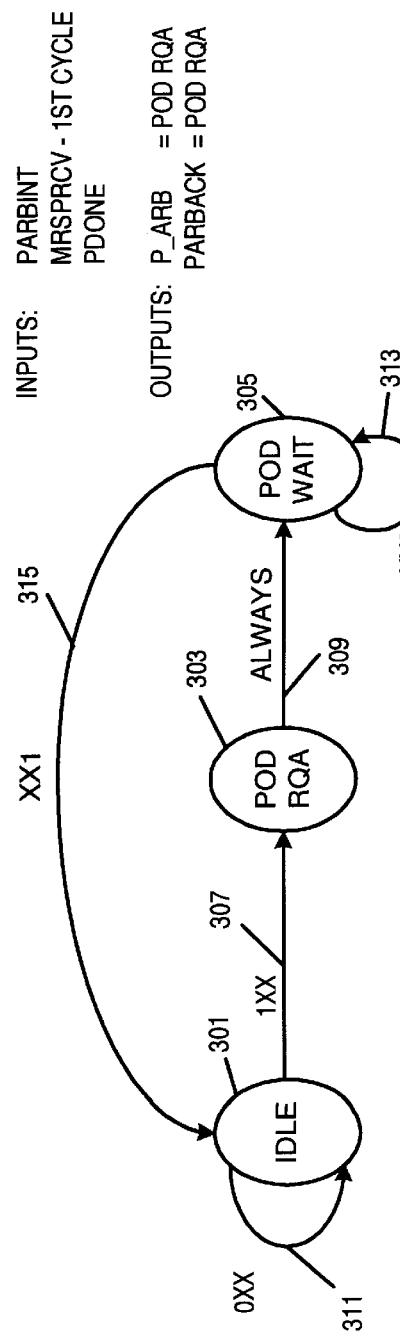
FIG. 16 is a state diagram describing the POD side of the data bus control, and more specifically shows the states where the POD requests the bus.

FIG. 16 is a state diagram describing the POD side of the data bus control, and more specifically shows the states where the POD requests the bus. Beginning at idle state 301, control will pass to state POD RQA 303 via interface 307 if the internal POD data request signal from the request queue logic is set high. Otherwise, control will loop back to the idle state 301 via interface 311.

At state POD RQA 303, control will always pass to state POD WAIT 305 via interface 309. At state POD WAIT 305, control will pass back to state idle 301 via interface 315 if the next cycle is the final data transmission for this POD data request, else control will loop back to the POD WAIT state 305 via interface 313.

Figure 17:
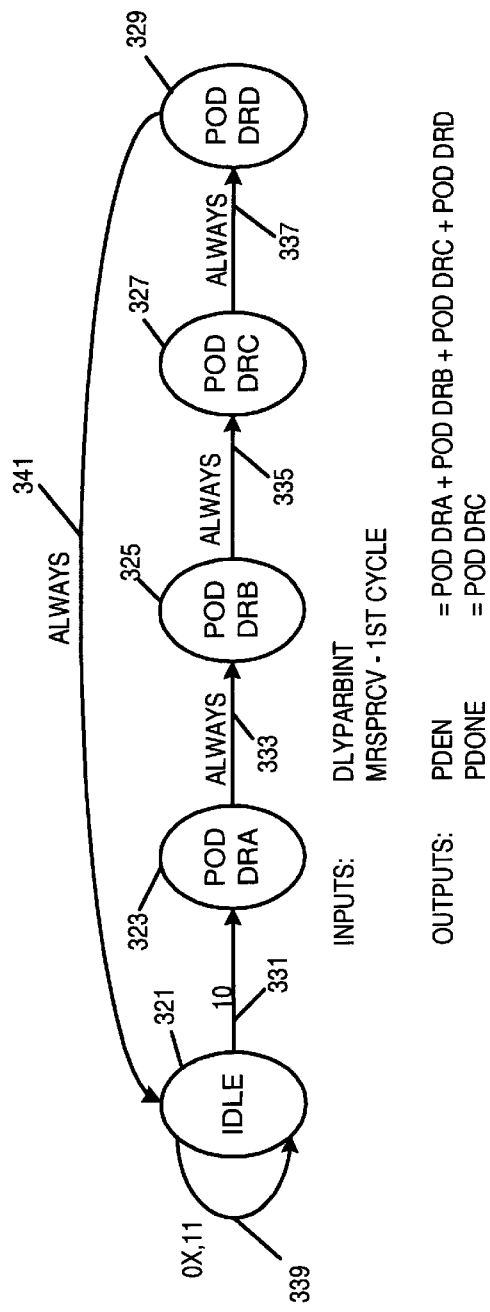
FIG. 17 is a state diagram describing the POD side of the data bus control, and more specifically illustrates the states for driving the bus.

FIG. 17 is a state diagram describing the POD side of the data bus control, and more specifically illustrates the states for driving the bus. Beginning at the idle state 321, control will pass to state POD DRA 323 via interface 331 if the internal POD data request is delayed by the appropriate latency time. Otherwise, control will loop back to the idle state 321 via interface 339.

At state POD DRA 323, control will always pass to state POD DRB 325 via interface 333. At state POD DRB 325, control will always pass to state POD DRC 327 via interface 335. At state POD DRC 327, control will always pass to state POD DRD 329 via interface 327. At state DRD 329, control will always pass back to the idle state 321 via interface 341.

Figure 18:
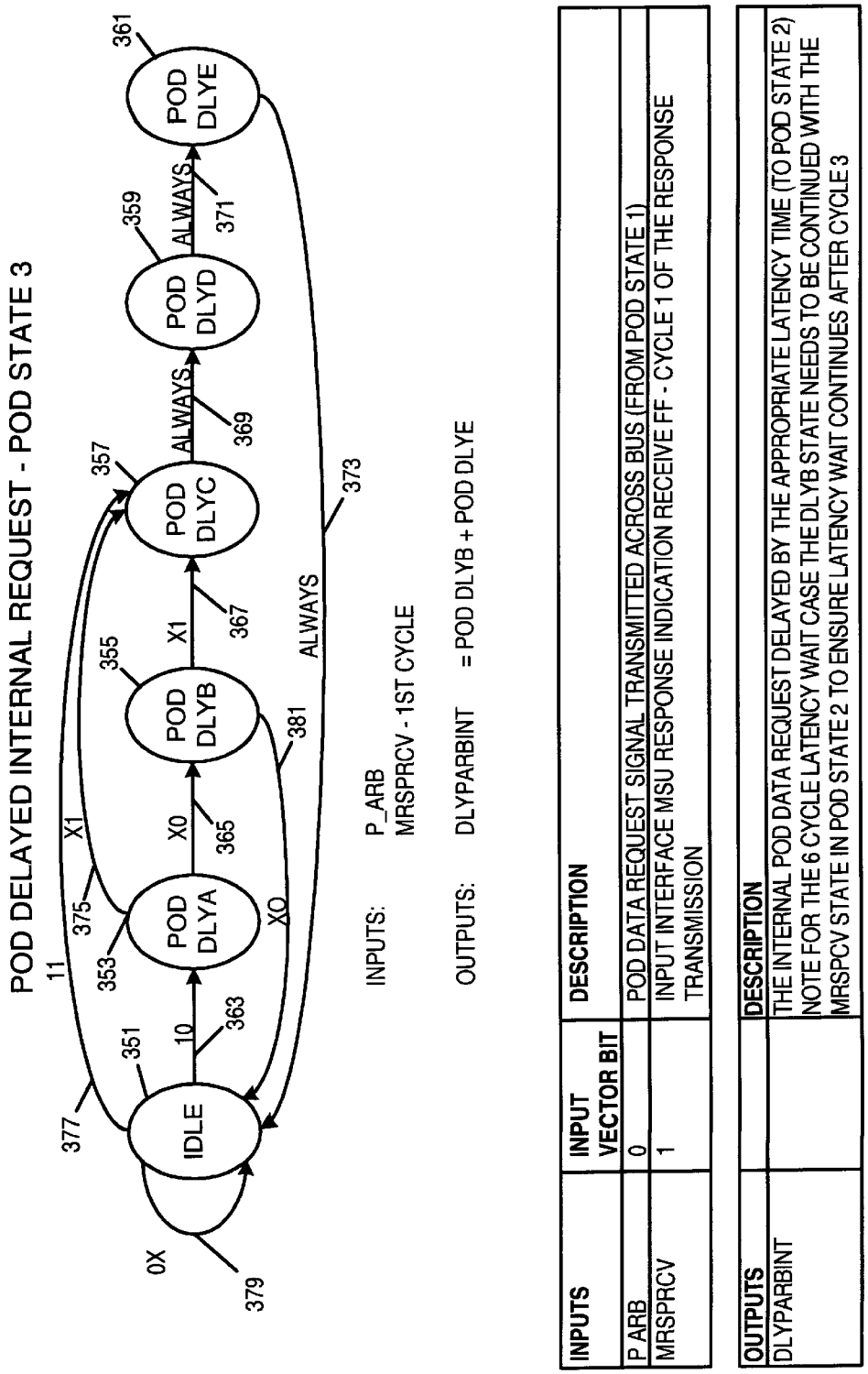
FIG. 18 is a state diagram describing the POD side of the data bus control, and more specifically illustrates the states that control the latency period of data request to data transmission.

FIG. 18 is a state diagram describing the POD side of the data bus control, and more specifically illustrates the states that control the latency period of data request to data transmission. Beginning at idle state 351, control will pass to state POD DLYA 353 via interface 363 when signal P_ARB is high (there is a POD data request signal transmitted across bus) AND no MRSPRCV signal was received from the MSU, otherwise control is looped back to idle state 351 via interface 379. If a POD data request signal is being transmitted across the bus AND an MRSPRCV signal is received from the MSU, control passes to state POD DLYC 357 via interface 377.

At state 353, control will pass to state POD DLYC 357 via interface 375 if signal MRSPRCV goes high (input interface MSU response indication receive FF- cycle 1 of the response transmission), else control passes to state POD DLYB 355 via interface 365. At state POD DLYB 355, control will pass to state POD DLYC 357 via interface 367 if signal MRSPRCV is high, else control passes back to the idle state 351 via interface 381. At state POD DLYC 357, control always passes to state POD DLYD 359 via interface 369. At state POD DLYD 359, control always passes to state POD DLYE via interface 371. At state POD DLYE 361, control will always be passed back to the idle state 351 via interface 373.

Figure 19:
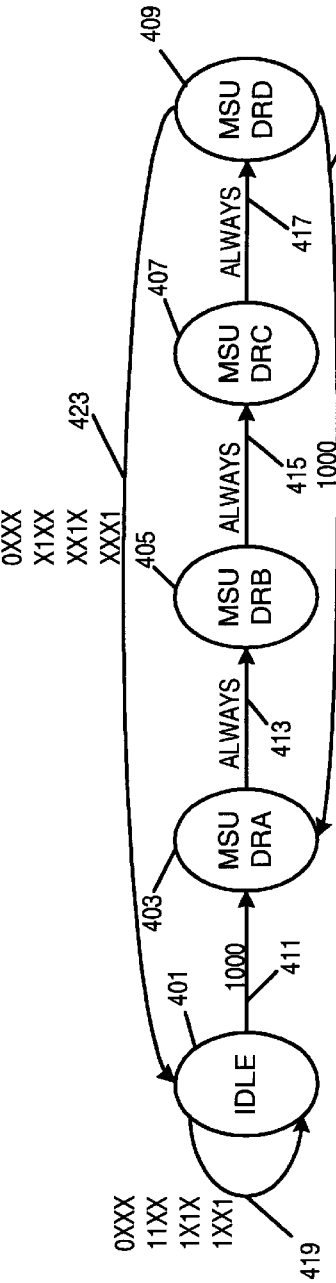
FIG. 19 is a state diagram describing the MSU side of the data bus control, and more specifically describes the MSU response and data bus drive states.

FIG. 19 is a state diagram describing the MSU side of the data bus control, and more specifically describes the MSU response and data bus drive states. Beginning at idle state 401, control will pass to state MSU DRA 403 via interface 411 if an internal MSU response request from request queue logic is received, and all remaining inputs are low (no POD request activity is detected), otherwise control will loop back to the idle state 401 via interface 419.

At MSU DRA state 403, control always passes to state MSU DRB state 405 via interface 413. At MSU DRB state 405, control always passes to state MSU DRC 407 via interface 415. At MSU DRC state 407, control always passes to state MSU DRD 409 via interface 417. At MSU DRD state 409, control will pass back to state MSU DRA 403 via interface 421 if an internal MSU response request is received from the request queue logic and all remaining inputs are low (no POD request activity is detected), otherwise control passes back to the idle state 401 via interface 423.

Figure 20:
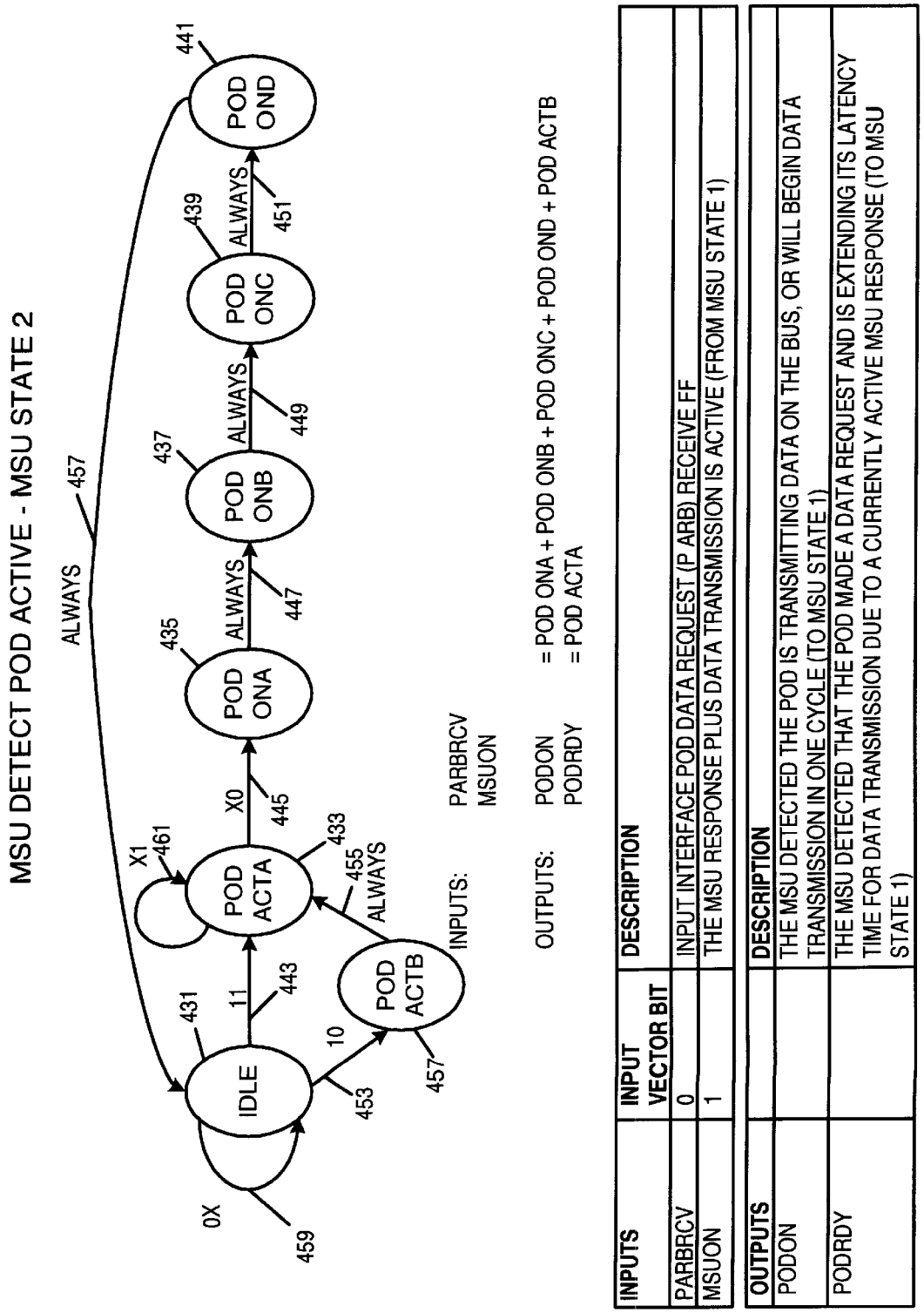
FIG. 20 is a state diagram describing the MSU side of the data bus control, and more specifically describes the states necessary to detect POD data transmission.

FIG. 20 is a state diagram describing the MSU side of the data bus control, and more specifically describes the states necessary to detect POD data transmission. Beginning at idle state 431, control passes to state POD ACTA via interface 443 when signal PARBRCV (input interface POD data request) goes high AND the MSU response plus data transmission is active. If the input interface POD data request goes high, but the MSU response plus data transmission is inactive, control will pass to state POD ACTB 457 via interface 453. If the input interface POD data request remains low, control will loop back to the idle state 431 via interface 459.

At state POD ACTA 433, control will transfer to state POD ONA 435 via interface 445 when the MSU response plus data transmission is inactive, otherwise if the MSU response plus data transmission is active, control will loop back to node POD ACTA 433 via interface 461.

At state POD ACTB 457, control will always transfer to state POD ONA 435 via interface 455. At state POD ONA 435, control will always transfer to state POD ONB 437 via interface 447. At state POD ONB 437, control will always transfer to state POD ONC 439 via interface 449. At state POD ONC 439, control will always transfer to state POD OND 441 via interface 451. At state POD OND 441 control will always transfer back to the idle state 431 via interface 457.

Having thus described the preferred embodiments of the present invention, those of skill in the art will readily appreciate that the teachings found herein may be applied to yet other embodiments within the scope of the claims hereto attached.

What is claimed is:

1. In a general purpose digital computer apparatus having at least two system components interconnected by at least one bi-directional interface having a first direction of data transfer and a second direction of data transfer, the improvement comprising:

distributed transfer control means coupled to said interface for minimizing latency to storage while maintaining access to said interface amongst said system components; and wherein said transfer control means may control the bi-directional interface such that the interface exhibits differing performance characteristics in said first direction from said second direction.

2. An improvement according to claim 1 wherein said interface comprises both a data bus and a function/address bus.

3. An improvement according to claim 2 wherein said data bus and said function/address bus operate independently.

4. An improvement according to claim 1 wherein said transfer control means comprises one or more distributed states machines.

5. An improvement according to claim 4 wherein said distributed state machine further comprises a first portion which resides in a first system component and a second portion which resides in a second system component.

6. An improvement according to claim 5 wherein the interface uses a group of signals to provide communication between the first portion and the second portion of said distributed state machine.

7. In a general purpose digital computer apparatus having at least two system components interconnected by at least one bi-directional interface having a first direction of data transfer and a second direction of data transfer, the improvement comprising:

distributed transfer control means coupled to said interface for minimizing latency to storage while maintaining access to said interface amongst said system components;

wherein said transfer control means includes one or more distributed state machines;

wherein said distributed state machine further includes a first portion which resides in a first system component and a second portion which resides in a second system component;

wherein the interface uses a group of signals to provide communication between the first Dortion and the second portion of said distributed state machine; and wherein said group of signals includes a subset of signals used to correlate a set of data being returned from the second system component to a corresponding data request from the first system component.

8. An improvement according to claim 7 wherein said transfer control means further comprises a set of tri-state drivers for transfering data in said first direction and said second direction.

9. An improvement according to claim 8 wherein the data processing system is a symmetrical multiprocessor system.

10. An improvement according to claim 9 wherein the data processing system comprises up to four Memory Storage Units (MSUs), and up to four Processing Modules (PODs).

11. An improvement according to claim 10 wherein one or more of said interfaces exist between said Memory Storage Units (MSUs) and said Processing Modules (PODs).

12. An improvement according to claim 10 wherein each said Processing Module (POD) comprises two SUB-PODs, two Direct Input/Output Bridge (DIB) modules, and one memory interface module (TCM).

13. An improvement according to claim 12 wherein one or more of said interfaces exist between said Direct Input/Output Bridge (DIB) Modules and said memory interface module (TCM).

14. An improvement according to claim 12 wherein one or more of said interfaces exist between said SUB-POD's and said memory interface module (TCM).

15. An improvement according to claim 11 wherein the function/address bus always defaults to favor the module farthest from the MSU such that under idle conditions, the module can issue an address request immediately on any bus cycle.

16. An improvement according to claim 11 wherein a POD request signal and a first cycle of an address are transmitted simultaneously on the function/address bus on a first cycle of said POD request, and the remainder of said address is transmitted on a second cycle of said POD request.

17. An improvement according to claim 11 wherein the POD may stream out a series of requests continuously on the function/address bus, as long as the distributed state machine associated with the POD does not detect a request generated from the MSU.

18. An improvement according to claim 11 wherein on the function/address bus, if the POD is active and the MSU is also requesting the function/address bus, a POD request may need to wait until up to three said requests from the MSU have been completed.

19. An improvement according to claim 11 wherein an MSU request on the function/address bus can be made on any cycle, the request is active for one cycle, and after a latency period of at least three cycles, the address is transmitted in two cycles.

20. An improvement according to claim 19 wherein if a POD request on the function/address bus is detected during the MSU request/latency period, the MSU delays the address transmission by one more cycle to ensure the POD interface turn off and the MSU interface turn on do not overlap.

21. An improvement according to claim 11 wherein on the function/address bus, MSU requests are allowed to continue until a queue of said MSU requests is empty or until the transfer control means detects that three successive MSU requests have been sent without allowing an intervening four cycle window for a POD request.

22. An improvement according to claim 11 wherein one dead cycle is provided between said POD/MSU transmissions on the function/address bus to avoid any overlap of bus turnoff/turnon that could result in simultaneous drive of the bus.

23. An improvement according to claim 11 wherein said data bus is a source synchronous interface operating at twice the primary clock frequency, such that two data transfers occur in one bus cycle.

24. An improvement according to claim 11 wherein said data bus always defaults to favor the MSU such that under idle conditions, the MSU issues cycle one of its two-cycle response signal and a first container of data immediately on any bus cycle.

25. An improvement according to claim 11 wherein after the MSU has transmitted the first container of data on the data bus, the remaining containers of data are transmitted over the next three cycles.

26. An improvement according to claim 11 wherein the MSU may stream out requests to the data bus continuously, as long as its state machine does not detect a POD data request.

27. An improvement according to claim 11 wherein if the MSU is active and also detects the POD requesting the data bus, the MSU completes its current response, then turns its drivers off until after the POD request has been serviced.

28. An improvement according to claim 11 wherein a POD data request on the data bus can be made on any cycle, with the request signal active for one cycle, such that after a latency period of a minimum of three cycles, the data is transmitted in 4 cycles.

29. An improvement according to claim 28 wherein the POD may issue a new data request on the data bus on the cycle after the last data transmission of the current request.

30. An improvement according to claim 11 wherein one dead cycle is provided between said POD/MSU transmissions on the data bus in order to avoid any overlap of bus turn off/turn on that could result in simultaneous drive of the bus.

31. An improvement according to claim 13 wherein said data bus is a source synchronous interface operating at twice the primary clock frequency, such that two data transfers may occur in one bus cycle, and a complete data transmission takes 4 bus cycles, or 8 bus half-cycles.

32. An improvement according to claim 13 wherein the data bus always defaults to favor the TCM such that under idle conditions, the TCM can issue cycle one of its twocycle response signal and a first container of data immediately on any bus cycle.

33. An improvement according to claim 13 wherein the TCM may stream out requests to the data bus continuously, as long as the TCM state machine does not detect any DIB data request activity.

34. An improvement according to claim 13 wherein one dead cycle must be inserted between data transmissions on the data bus when there is a change of ownership of the bus.

35. An improvement according to claim 13 wherein the data bus is at a high impedance state with internal pull down resistors when not actively transferring data.

36. An improvement according to claim 13 wherein the data bus allows for cache line streaming.

37. An improvement according to claim 13 wherein the transfer of an address/function request from the DIB that requires the data bus informs the TCM of the DIB's need for the data bus.

38. An improvement according to claim 13 wherein the DIB can transfer up to four address/function requests that require the data bus, before the DIB must wait for a first cache line to transfer on the data bus.

39. An improvement according to claim 13 wherein a DIB address/function request can be made on any cycle.

40. An improvement according to claim 13 wherein after the DIB issues an address/function request, a latency period of at least three cycles takes place before a cache line is transmitted for four cycles.

41. An apparatus for distributed control of an interface in a general purpose computer system comprising:
   a. at least two system components;
   b. at least one point-to-point bi-directional interface;
   c. a distributed transfer controller coupled to said interface for minimizing latency to storage while maintaining access to said interfaces amongst said system components; and
   wherein said transfer control means comprises one or more distributed state machines.

42. An apparatus according to claim 41 wherein a first portion of said distributed state machine resides in a first system component and a second portion of said distributed state machine resides in a second system component.

43. An apparatus for distributed control of an interface in a general purpose computer system comprising:
   a. at least two system components;
   b. at least one bi-directional interface;
   c. a distributed transfer controller coupled to said interface for minimizing latency to storage while maintaining access to said interfaces amongst said system components;
   d. wherein said transfer control means comprises one or more distributed state machines;
   e. wherein a first portion of said distributed state machine resides in a first system component and a second portion of said distributed state machine resides in a second system component; and
   f. wherein said transfer control means minimizes latency to storage by controlling and biasing the directional characteristics of a set of tri-state drivers associated with said interface.

44. A method for controlling a bi-directional point-to-point interface in a symmetrical multiprocessor system comprising:
   a. defining a distributed state machine wherein a first portion of the distributed state machine resides in a first system component at a first end of said point-to-point interface and a second portion of the distributed state machine resides in a second component at a second end of said point-to-point interface;
   b. managing the flow of data and function/address information between said first and second system components via said distributed state machine such that latency to storage is minimized while preserving access to said interface by said first and second system components; and
   c. correlating data returned from a second component with a corresponding data request from a first system component.

45. A method according to claim 44 wherein said interface uses a group of signals to provide communication between the first portion and second portion of the distributed state machine.

46. A method for controlling a bi-directional interface in a symmetrical multiprocessor system comprising:
   a. defining a distributed state machine wherein a first portion of the distributed state machine resides in a first system component at a first end of said interface and a second portion of the distributed state machine resides in a second component at a second end of said interface;
   b. managing the flow of data and function/address information between said first and second system components via said distributed state machine such that latency to storage is minimized while preserving access to said interface by said first and second system components.
   c. correlating data returned from a second component with a corresponding data request from a first system component;
   d. wherein said interface uses a group of signals to provide communication between the first portion and second portion of the distributed state machine; and
   e. wherein said state machine minimizes latency to storage by controlling and biasing the directional characteristics of a set of tri-state drivers associated with the interface.

* * * * *

UNITED STATES PATENT AND TRADEMARK OFFICE
CERTIFICATE OF CORRECTION

PATENT NO. : 6,182,112 B1  Page 1 of 1
DATED : January 30, 2001
INVENTOR(S) : Malek et al.

It is certified that error appears in the above-identified patent and that said Letters Patent is hereby corrected as shown below:

Column 17,
Line 51, thereof, delete "Dortion" and insert therefor -- portion --.

Signed and Sealed this

Ninth Day of July, 2002

Attest:

JAMES E. ROGAN
Attesting Officer   Director of the United States Patent and Trademark Office